United States Patent [19]

Sanchez

[11] Patent Number: 5,039,754

[45] Date of Patent: Aug. 13, 1991

[54] POLYMERIC PEROXIDES DERIVED FROM HYDROXY-HYDROPEROXIDES AND DIHYDROXYDIALKYL PEROXIDES AND THEIR USES

[75] Inventor: Jose Sanchez, Grand Island, N.Y.

[73] Assignee: Atochem North America, Inc., Philadelphia, Pa.

[21] Appl. No.: 575,031

[22] Filed: Aug. 30, 1990

[51] Int. Cl.$^5$ .............................................. C08L 75/00
[52] U.S. Cl. .............................. 525/333.8; 525/451; 526/216; 526/230.5; 526/232.3; 528/49; 528/76; 528/85; 528/272; 528/301; 528/370; 528/372; 528/263; 528/264; 528/265; 560/158; 560/198; 560/202
[58] Field of Search ............................ 525/333.8, 451; 526/216, 230.5, 232.3; 528/49, 76, 85, 272, 301, 370, 372; 558/263, 264, 265; 560/158, 198, 202

[56] References Cited

U.S. PATENT DOCUMENTS

| | | | |
|---|---|---|---|
| 4,283,512 | 8/1981 | Matsushima et al. | 525/438 |
| 4,304,882 | 12/1981 | D'Angelo et al. | 525/88 |
| 4,315,997 | 7/1980 | Ujikawa et al. | 525/94 |
| 4,318,834 | 3/1982 | Ohmura et al. | 524/599 |
| 4,321,179 | 3/1982 | Ohmura et al. | 524/599 |
| 4,525,308 | 6/1985 | Sanchez | 260/453 |
| 4,593,067 | 6/1986 | Nakayama et al. | 525/92 |

OTHER PUBLICATIONS

*Polymer Handbook*, 2nd Ed., John Wiley & Sons, New York, pp. I-1-I-13.
*Kirk-Othmer Encyclopedia of Chemical Technology*, 3rd Ed., "Urethane Polymers," (Henri Ulrich), pp. 576-608.
B. Hazer, "Polymerization of Vinyl Monomers by New Oligoperoxide: Oligo(Adipoyl-5-Peroxy-2,-5-Dimethyl n-Hexyl Peroxide)", *Journal of Polymer Science: Part A: Polymer Chemistry*, vol. 25, pp. 3349-3354 (1987).

Primary Examiner—Maurice J. Welsh
Attorney, Agent, or Firm—Panitch Schwarze Jacobs & Nadel

[57] ABSTRACT

A polymeric peroxide comprising a dilvalent recurring unit having the formula:

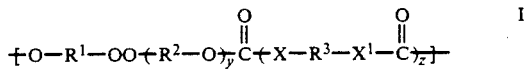

wherein the recurring unit of Formula I has a 10 hour half-life temperature of at least 80° C. and optionally a divalent recurring unit having the formula:

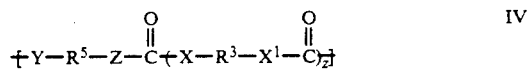

wherein $R^1$, $R^2$, $R^3$, $R^5$, X, $X^1$, Y, Z, y and z are as defined in the Detailed Description of the Preferred Embodiments and the polymeric peroxide has a molecular weight of 1,000 to 200,000. The polymeric peroxides are derived from hydroxy-hydroperoxides of dihydroxy dialkyl peroxides. These polymeric peroxides can be used for preparing block copolymers and compatibilizing polymer blends and alloys.

35 Claims, No Drawings

POLYMERIC PEROXIDES DERIVED FROM HYDROXY-HYDROPEROXIDES AND DIHYDROXYDIALKYL PEROXIDES AND THEIR USES

BACKGROUND OF THE INVENTION

1. Field of the Invention

This invention relates to novel polymeric peroxides derived from hydroxy-hydroperoxides and dihydroxydialkyl peroxides. The present invention also relates to the preparation and use of these novel polymeric peroxides for curing unsaturated polyester resins, polymerizing ethylenically unsaturated monomers, curing elastomer resins, reducing the molecular weight and modifying the molecular weight distribution of polypropylene/propylene copolymers, crosslinking olefin polymers and preparing block copolymers and for compatibilizing polymeric blends and alloys.

2. Description of Prior Art

Addition polymers, such as polystyrene (PS), poly(methyl methacrylate) (PMMA), poly(vinyl chloride) (PVC), poly(vinyl acetate) (PVAc), polyethylene (PE) and polypropylene (PP) and condensation polymers, such as polycarbonates, polyesters, polyurethanes, polyimides and polyamides (e.g., nylons) possess highly differing physical and chemical properties. These addition and condensation polymers are also generally made by very different processes.

In general, commercial addition polymers are made by free radical, anionic or cationic chemical processes. Addition polymers are generally produced from monomers possessing ethylenically unsaturated double bonds. Furthermore, commercial addition polymers are commodity polymers, i.e., they are produced in large volumes, are easily processed in polymer processing equipment, have low unit prices and low profit margins. Free-radically initiated addition polymers generally do not have acceptable high temperature properties that would enable them to be used alone in engineering applications. Thus, addition polymers are not considered to be "engineering thermoplastics."

In contrast, commercial condensation polymers are produced by condensation chemical processes and are generally produced from one or more monomers that chain extend via classical condensation chemistry. Commercial condensation polymers are generally produced in much lower volumes, are more difficult to process, have high unit costs and are much more profitable. Owing to their high temperature properties, commercial condensation polymers, such as aromatic polycarbonates, polyarylates and nylons, are used extensively in engineering thermoplastic applications.

Peroxides are generally only used to initiate polymerization of monomers that can generally only form addition polymers. Peroxides generally cannot initiate polymerization of condensation monomers.

Resin compounders continually strive to improve the cost performance parameters of both commodity addition polymers and engineering thermoplastics by blending the commodity addition polymers with engineering thermoplastics. In rare instances, completely miscible or compatible blends are obtained when engineering thermoplastics are blended with commodity addition polymers.

In recent years, most of the new, commercialized polymeric materials are polymeric blends and alloys composed of two or more different polymers. This trend of commercially developing polymeric blends and alloys is due in part to the short time required for developing and commercializing these materials; the relatively low R&D cost involved for developing these materials as compared to the cost for developing entirely new polymers from monomers; and the ability to develop polymeric blends and alloys that are "tailor made" to meet end-use property specifications.

A non-limiting list of the polymer property improvements achieved by blending include:
(1) Better processability;
(2) Impact strength enhancement;
(3) Improved flame retardance;
(4) Improved barrier properties;
(5) Improved tensile properties;
(6) Improved adhesion;
(7) Improved melt flow;
(8) Enhanced heat resistance;
(9) Enhanced heat distortion temperature (HDT)
(10) Improved stiffness:
(11) Improved chemical resistance; and
(12) Improved ultraviolet light stability.

The major problem encountered in developing new polymeric blends and alloys is the inherent incompatibility or immiscibility of almost all mixtures of two or more polymers. For example, almost all blends of addition polymers with condensation engineering thermoplastics are incompatible. The consequence of incompatibility of polymeric blends and alloys is that they are thermodynamically unstable and, consequently, do not have good mechanical and thermal properties. With sufficient time and temperature, the polymeric blends and alloys generally coalesce into separate phases.

An approach used by resin compounders to improve the compatibility of immiscible blends is to use a block copolymer as a compatibilizing agent for the incompatible polymer blend. Generally, the block copolymer should have polymeric segments that are compatible with both polymeric components of the blend. For example, when trying to form a stable blend of an addition polymer with a condensation engineering thermoplastic polymer, a compatible blend is more likely obtained if the block copolymer has addition polymer segments and condensation polymer segments.

Low cost polymeric blends and alloys are generally commercially produced from two or more addition polymers, such as polymeric blends comprising low density polyethylene (LDPE), linear low density polyethylene (LLDPE), high density polyethylene (HDPE) and polypropylene (PP). The compatibility of these low cost polymeric blends can be improved by crosslinking the polymeric blends with peroxides or by using compatibilizing block copolymers as mentioned above. Such compatibilizing block copolymers would generally have to be made from appropriate addition polymeric peroxides.

The most profitable polymeric blends and alloys are those made from low cost, commodity addition polymers initiated by free radicals and high cost, high value engineering condensation thermoplastic polymers. Here, the resin producer is either trying to up-grade the physical properties of the low cost commodity addition polymer or is trying to lower the cost of the engineering resin without significantly deleteriously affecting the polymer properties.

Polymeric peroxides are often used for preparing block copolymers. In general, block copolymers are useful for compatibilizing blends of polymers that are otherwise incompatible. Thus, there is a demand in the polymer industry for polymeric peroxides, since these polymeric peroxides can be used to produce block copolymers which in turn can be used as compatibilizing agents for polymeric blends and alloys derived from polymers that are incompatible with each other. The most effective compatibilizing block copolymer compositions are those which contain the greatest amount of block copolymer and the least amount of homopolymer. The polymeric peroxides of the present invention are very effective for preparing block copolymer compositions possessing lowered levels of homopolymer.

A block copolymer of two or more ethylenically unsaturated monomers can be made by partially decomposing the polymeric peroxide in the presence of a monomer, followed by decomposing the resulting polymeric product in the presence of a second monomer, and so on. These processes can be carried out in solution or in polymer processing equipment, such as an extruder.

Since block copolymers have utility in compatibilizing polymeric blends and alloys, there is a need for processes that produce block copolymer compatibilizing agents where one polymer segment is an addition polymer segment and the other polymer segment is a condensation engineering polymer segment.

In general, the polymeric peroxides of the prior art are not as effective for producing condensation-addition block copolymers as the novel polymeric peroxides of the present invention.

U.S. Pat. No. 4,304,882 discloses polymeric peroxides having peroxyester, monoperoxycarbonate, diperoxycarbonate, dialkyl peroxide and diperoxyketal moieties at the polymer chain ends and various polymeric peroxides with peroxyester and diacyl peroxides having 10 hour half-life temperatures below about 75° C. as recurring moieties along the polymer backbone chain. Decomposition of the peroxide end groups results in formation of one macro-free radical and one micro-free radical. In the presence of an ethylenically unsaturated monomer, the formed macro-free radical produces a block copolymer including addition monomer polymer blocks (AMP) and the formed micro-free radical produces a homopolymer also containing AMPs, as illustrated by the following equations:

[Polymer]—OO—R + Heat ⟶

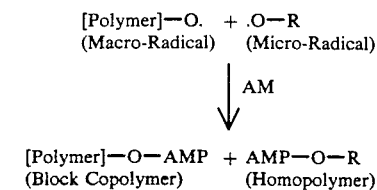

Thus, as illustrated by the above equations, a mixture of a block copolymer and a homopolymer is produced. This is undesirable since the presence of a homopolymer decreases the effectiveness of the block copolymer composition for compatibilizing blends of polymers, which is a major utility of block copolymers.

The polymeric peroxides disclosed in U.S. Pat. No. 4,304,882 having recurring diperoxyester functions cannot be used to prepare block copolymers that are relatively free of homopolymers. This is a result of the recurring diperoxyester functions ultimately decomposing to two macro-free radicals and one micro-diradical. Although the macro-free radicals result in formation of a block copolymer, the micro-diradical results in formation of significant amounts of a homopolymer:

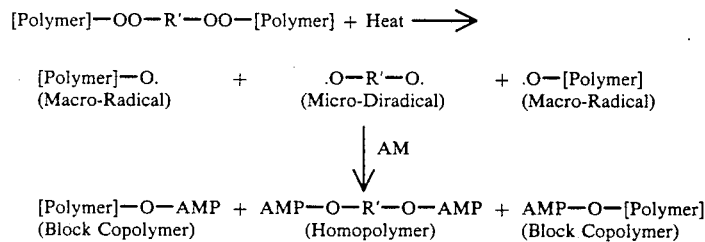

The polymeric peroxides of U.S. Pat. No. 4,304,882 possessing diacyl peroxide recurring units can be used for preparing a block copolymer that is relatively free of homopolymer, since a diacyl peroxide recurring unit decomposes to two macro-free radicals. However, the generally low 10 hour half-life temperatures of these recurring units (i.e., below 75° C.), limit the usefulness of these polymeric peroxides. Polymeric peroxides are typically used in applications at higher temperatures where the diacyl peroxide-polymers of U.S. Pat. No. 4,304,882 would prematurely decompose.

U.S. Pat. No. 4,283,512 discloses polymeric peroxide compositions having recurring diacyl peroxide units and U.S. Pat. No. 4,318,834 discloses polymeric peroxide compositions having recurring diacyl peroxide units and recurring diperoxyester units. In addition, both references disclose the use of these polymeric peroxides for initiating polymerization of a vinyl monomer, thus making vinyl polymers having recurring diacyl peroxide units or diperoxyester recurring units in the backbone. These vinyl polymers are subsequently used for preparing mixtures of block copolymers and homopolymers by means of initiating polymerization of a second vinyl monomer.

U.S. Pat. Nos. 4,321,179, 4,315,997 and 4,593,067 also disclose polymeric peroxides with recurring diacyl peroxide or diperoxyester units similar to the other prior art polymeric peroxides, and generally have the same problems and limitations as the polymeric peroxides disclosed in U.S. Pat. No. 4,304,882.

The polymeric peroxides of the present invention possess peroxide-containing recurring moieties with 10 hour half-life temperatures higher than those of the diacyl peroxide polymers of U.S. Pat. No. 4,304,882 and the other prior art references, they are significantly more effective and useful for preparing block copolymers and thus advance the art.

SUMMARY OF THE INVENTION

One aspect of the invention relates to a polymeric peroxide compound having a molecular weight of about 1,000 to about 200,000 comprising at least one divalent recurring unit, each independently having the following Formula I:

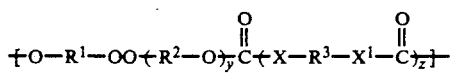

wherein $R^1$ and $R^2$ are independently substituted alkylene diradicals of 2 to 8 carbons, where the substituents are two or more lower alkyl radicals of 1 to 4 carbons, two of the substituents being located on the carbon atoms of the $R^1$ and $R^2$ alkylene diradicals that are adjacent to the —OO— group;

$R^3$ is an alkylene diradical of 2 to 18 carbons, where the diradical may contain one or more oxygen, sulfur or nitrogen heteroatoms, with the proviso that multiple heteroatoms must be separated from each other by at least one carbon atom and the diradical ends by at least two carbon atoms, an alkenylene diradical of 2 to 6 carbons, a substituted or unsubstituted arylene diradical of 6 to 14 carbons, a substituted or unsubstituted hexahydroaralkylene diradical of 8 to 12 carbons, a substituted or unsubstituted diradical having the following Formula II:

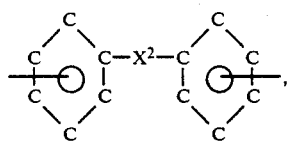

wherein the $R^3$ substituents are alkyl of 1 to 15 carbons, bromo, chloro, nitro, sulfo or carboxy, a polymeric diradical having a molecular weight of up to about 5,000, wherein the polymeric diradical is a poly(oxyethylene) diradical, a poly(oxypropylene) diradical, a poly(oxytetramethylene) diradical, a poly(oxyethylene-block-oxypropylene) diradical, a poly(oxyethylene-block-oxypropylene-block-oxyethylene) diradical, a polybutadiene diradical, a polymeric diradical having the following Formula III:

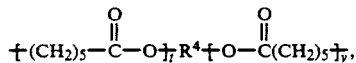

or, when both X and $X^1$ are direct bonds, a methylene diradical;

$R^4$ is an alkylene diradical of 2 to 8 carbons, where the diradical may contain one or more oxygen, sulfur or nitrogen heteroatoms, with the proviso that multiple heteroatoms must be separated from each other by at least one carbon atom and the diradical ends by at least two carbon atoms;

X and $X^1$ are independently a direct bond, —O— or —NH—;

$X^2$ is a direct bond, —O—, —S—, —S(=O)—, —S(=O)$_2$—, —C(=O)—, a substituted or unsubstituted alkylene diradical of 1 to 6 carbons in which the substituent is lower alkyl of 1 to 4 carbons, a substituted or unsubstituted alkylidene diradical of 2 to 12 carbons where the substituents are lower alkyl of 1 to 4 carbons, fluoro, chloro or bromo, or a substituted or unsubstituted cycloalkylidene diradical of 6 to 12 carbons where the substituents are lower alkyl of 1 to 4 carbons, fluoro, chloro or bromo;

t and v are integers and the sum of t and v is 2 to 30; y and z are 0 or 1; and the recurring unit of Formula I has a 10-hour half-life temperature of at least 80° C.

Another aspect of the invention relates to a process for preparing a polymeric peroxide compound comprising reacting at least one peroxide having the following Formula V:

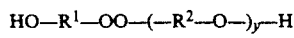

wherein $R^1$, $R^2$ and y are as previously defined;

with one or more of phosgene, a bis-haloformate, a polyhaloformate, a diacid halide, a polyacid halide, a diisocyanate, a polyisocyanate and a dianhydride to form a peroxy-containing polymer;

followed by isolating the peroxy-containing polymer.

DETAILED DESCRIPTION OF THE PREFERRED EMBODIMENTS

As indicated in the above Summary of the Invention, this invention relates to a polymeric peroxide compound having a molecular weight of about 1,000 to about 200,000 comprising a divalent recurring unit having the following Formula I:

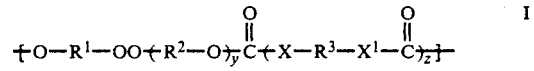

wherein $R^1$, $R^2$, $R^3$, X, $X^1$, y and z are as previously defined.

The polymeric peroxide compound of the present invention may comprise one or more divalent recurring units of Formula I wherein the divalent recurring units of Formula I have the same chemical structure or a different chemical structure.

Further in accordance with the present invention, the polymeric peroxide comprising recurring units of Formula I may further comprise at least one divalent recurring unit, each independently having the following Formula IV:

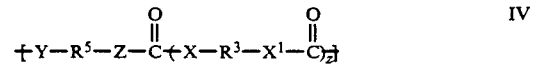

wherein $R^5$ is a substituted or unsubstituted alkylene diradical of 2 to 18 carbons, where the diradical may contain one or more oxygen, sulfur or nitrogen heteroatoms, with the proviso that multiple heteroatoms must be separated from each other by at least one carbon atom and the diradical ends by at least two carbon atoms, a substituted or unsubstituted cycloalkylene diradical of 5 to 7 carbons, a substituted or unsubstituted alkenylene diradical of 2 to 6 carbons, a substituted or unsubstituted arylene diradical of 6 to 14 carbons, a substituted or unsubstituted aralkylene diradical of 8 to 12 carbons, a substituted or unsubstituted hexahydroaralkylene diradical of 8 to 12 carbons, a substituted or unsubstituted diradical having the following Formula II:

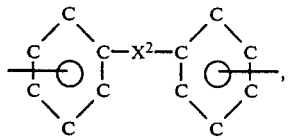
II wherein the $R^5$ substituents are alkyl of 1 to 15 carbons, bromo, chloro, nitro, sulfo or carboxy; or a polymeric diradical having a molecular weight of up to about 5,000, wherein the polymeric diradical is selected from the group consisting of a poly(oxyethylene) diradical, a poly(oxypropylene) diradical, a poly(oxytetramethylene) diradical, a poly(oxyethylene-block-oxypropylene) diradical, a poly(oxyethylene-block-oxypropylene-block-oxyethylene) diradical or a polybutadiene diradical, or a polymeric diradical having the following Formula III:

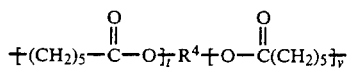
III wherein $R^3$, $R^4$, X, $X^1$, $X^2$, t, v and z are as previously defined;

Y and Z are independently —O—, —NH— or —$NR^6$—;

wherein $R^6$ is alkyl of 1 to 8 carbons and when Y and Z are independently —$NR^6$—, the $R^6$ groups can together form an alkylene bridge of two carbon atoms between the nitrogen atoms.

Thus, the polymeric compound of the present invention may comprise, in addition to one or more divalent recurring units of Formula I, one or more divalent recurring units of Formula IV, wherein each of the divalent recurring units of Formula IV may have the same chemical structure or they may each have a different chemical structure.

The novel polymeric peroxides of the present invention possess one or more differing recurring organic peroxide functions each having 10 hour half-life temperatures greater than about 80° C. The recurring organic peroxide functional groups include those of the monoperoxycarbonate type having 10 hour half-life temperatures of about 100° C., peroxyester type having 10 hour half-life temperatures of about 100° C., dialkyl peroxide type having 10 hour half-life temperatures of about 125° C. and peroxycarbamate (peroxyurethane) type having 10 hour half-life temperatures of about 85° C. In addition, the polymeric peroxides of this invention may also possess condensation polymer recurring units.

Some of the novel polymeric peroxides of the present invention are condensation monomer polymers (CMP) with peroxide-containing recurring units (PRU) in the backbone of the condensation polymer. These condensation polymers having peroxide-containing recurring units can be used for producing compatibilizing block copolymers containing condensation monomer polymer blocks (CMP) and addition monomer polymer blocks (AMP) via free-radical initiating polymerization of an addition monomer (AM) with the novel polymeric peroxides of this invention, as illustrated by the following equation:

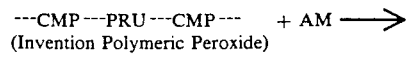
(Invention Polymeric Peroxide)

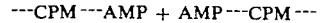

The novel polymeric peroxides of the present invention also have enhanced usefulness for preparing block copolymers containing low amounts of homopolymers, as distinguished from the prior art polymeric peroxides. This occurs because the peroxide-containing recurring units are in the backbone of the polymers, and decomposition of one of the peroxide-containing recurring units generates two macro-free radicals that initiate the polymerization of ethylenically unsaturated monomers resulting generally only in formation of two block copolymer units (AB block copolymers). Thus, generally no homopolymer forms, as illustrated by the following equation:

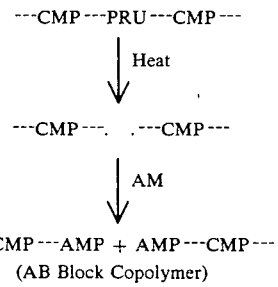
(AB Block Copolymer)

The polymeric peroxides of the present invention can also be used in reactive processing for compatibilizing polymers in situ by forming block copolymers in polymer processing equipment such as extruders, roll mills, etc. The polymeric peroxides can also be used to enhance the quality of an interpenetrating polymer network (IPN) in polymer processing equipment. The polymeric peroxides of the present invention can be used in reactive processing to enhance the impact resistance of polymer blends. The polymeric peroxides of this invention also have utility as polymeric low profile/low shrink curing agents, as self-curing polymeric systems and as self-degrading polymer systems. Furthermore, the polymeric peroxides of the present invention provide very useful polymeric peroxide masterbatches, i.e., safe, easily dispersible polymeric peroxide compositions having 5% or more organic peroxides, useful in crosslinking, curing and polymer modification applications. The peroxide functions of the polymeric peroxide masterbatches are covalently attached to the polymer and are therefore compatible with the polymer backbone. As a result, the peroxide functions cannot bloom, exude or volatilize.

The polymeric peroxides of the present invention can also be used for initiating polymerization of ethylenically unsaturated monomers, curing unsaturated polyester resin compositions, crosslinking/curing of elastomers, crosslinking of olefin polymers, graft polymerization of monomers onto other polymer backbones and for controlling the melt rheology of olefin polymers such as polypropylene (PP) and polyethylene (PE).

List of Illustrative Examples

Non-limiting examples of presently preferred polymeric peroxides of the present invention include the following compounds:

1. The compound wherein Formula I is oxy-(-1,3,3-trimethyltrimethylene)dioxy-(1,1,3-trimethyltrimethylene)oxyadipoyl.
2. The compound wherein Formula I is oxy-(-1,3,3-trimethyltrimethylene)dioxycarbonyloxyethyleneoxyethyleneoxycarbonyl and Formula IV is
   i) oxy-1,4-phenylene-(1-methylethylidene)-1,4-phenyleneoxycarbonyl and
   ii) oxy-1,4-phenylene-(1-methylethylidene)-1,4-phenyleneoxycarbonyloxyethyleneoxyethyleneoxycarbonyl.
3. The compound wherein Formula I is oxy-(1,3,3-trimethyltrimethylene)dioxy-(1,1,3-trimethyltrimethylene)oxycarbonyl and Formula IV is oxy-1,4-phenylene-(1-methylethylidene)-1,4-phenyleneoxycarbonyl.
4. The compound wherein Formula I is oxy-(1,3,3-trimethyltrimethylene)dioxycarbonyl and Formula IV is oxy-1,4-phenylene-(1-methylethylidene)-1,4-phenyleneoxycarbonyl.
5. The compound wherein Formula I is oxy-(1,3,3-trimethyltrimethylene)dioxyterephthaloyl and Formula IV is
   i) oxy-1,4-phenylene-(1-methylethylidene)-1,4-phenyleneoxycarbonyl and
   ii) oxy-1,4-phenylene-(1-methylethylidene)-1,4-phenyleneoxyterephthaloyl.
6. The compound wherein Formula I is
   i) oxy-(1,3,3-trimethyltrimethylene)dioxy-(1,1,3-trimethyltrimethylene)oxycarbonyl and
   ii) oxy-(1,3,3-trimethyltrimethylene)dioxy-(1,1,3-trimethyltrimethylene)oxyadipoyl; and
   Formula IV is
   i) oxy-1,4-phenylene-(1-methylethylidene)-1,4-phenyleneoxycarbonyl and
   ii) oxy-1,4-phenylene-(1-methylethylidene)-1,4-phenyleneoxyadipoyl.
7. The compound wherein Formula I is oxy-(1,3,3-trimethylrimethylene)dioxyisophthaloyl and Formula IV is
   i) oxy-1,4-phenylene-(1-methylethylidene)-1,4-phenyleneoxycarbonyl,
   ii) oxy-1,4-phenylene-(1-methylethylidene)-1,4-phenyleneoxyisophthaloyl,
   iii) oxy-(2,6-dibromo-1,4-phenylene)-(1-methylethylidene)-(3,5-dibromo-1,4-phenylene)oxycarbonyl and
   iv) oxy-(2,6-dibromo-1,4-phenylene)-(1-methylethylidene)-(3,5-dibromo-1,4-phenylene)oxyisophthaloyl.
8. The compound wherein Formula I is oxy-(1,3,3-trimethyltrimethylene)dioxyisophthaloyl and Formula IV is oxy-1,4-phenylene-(1-methylethylidene)-1,4-phenyleneoxyisophthaloyl.
9. The compound wherein Formula I is oxy-(1,3,3-trimethyltrimethylene)dioxy-(1,1,3-trimethyltrimethylene)oxyterephthaloyl and Formula IV is oxy-1,4-phenylene-(1-methylethylidene)-1,4-phenyleneoxyterephthaloyl.
10. The compound wherein Formula I is oxy-(3,3-dimethyltrimethylene)dioxycarbonyl and Formula IV is oxy-1,4-phenylene-(1-methylethylidene)-1,4-phenyleneoxycarbonyl.
11. The compound wherein Formula I is
    i) oxy-(1,3,3-trimethyltrimethylene)dioxy-(1,1,3-trimethyltrimethylene)oxyisophthaloyl and
    ii) oxy-(1,3,3-trimethyltrimethylene)dioxy-(1,1,3-trimethyltrimethylene)oxycarbonylimino-(x-methyl-1,3-phenylene)iminocarbonyl; and
    Formula IV is
    i) oxy-1,4-phenylene-(1-methylethylidene)-1,4-phenyleneoxyisophthaloyl and
    ii) oxy-1,4-phenylene-(1-methylethylidene)-1,4-phenyleneoxycarbonylimino-(x-methyl-1,3-phenylene)iminocarbonyl.
12. The compound wherein Formula I is oxy-(1,3,3-trimethyltrimethylene)dioxycarbonyldecamethylenecarbonyl and Formula IV is oxy-1,4-phenylene-(1-methylethylidene)-1,4-phenyleneoxycarbonyldecamethylenecarbonyl.
13. The compound wherein Formula I is oxy-(1,3,3-trimethyltrimethylene)oxycarbonyl and Formula IV is oxy(TONE ® 201 diradical)oxycarbonyl. TONE ® 201 is a registered trademark of Union Carbide Corp. for a compound having the diradical of Formula III endcapped with hydroxy groups and where the sum of t and v is about 4 to about 6. Thus, as used herein, the term "(TONE ® 201 diradical)" refers to a diradical of Formula III where the sum of t and v is about 4 to about 6.
14. The compound wherein Formula I is oxy-(1,3,3-trimethyltrimethylene)oxyterephthaloyl and Formula IV is oxy(TONE ® 201 diradical)oxyterephthaloyl.
15. The compound wherein Formula I is oxy-(1,3,3-trimethyltrimethylene)dioxycarbonyloxy(TONE ® 210 diradical)oxycarbonyl and Formula IV is oxy(TONE ® 201 diradical)oxycarbonyloxy(TONE ® 210 diradical)oxycarbonyl. TONE ® 210 is a registered trademark of Union Carbide Corp. for a compound having the diradical of Formula III endcapped with hydroxy groups and where the sum of t and v is about 7. Thus, as used herein, the term "(TONE ® 210 diradical)" refers to a diradical of Formula III where the sum of t and v is about 7.

When referred to in the above polymeric peroxide chemical compound names, "x-methyl" refers to a methyl group which may be located at more than one position of the aromatic ring to which the methyl group is bonded.

Other polymeric peroxide compounds in accordance with the present invention would be apparent to one skilled in the art based on the present disclosure.

Preparation of Polymeric-Peroxides of the Present Invention

The novel polymeric peroxides of this invention may be prepared by reacting, preferably, but not essentially, in the presence of a catalyst and a solvent, one or more of a hydroxy-hydroperoxide and/or a dihydroxy-dialkyl peroxide independently having the following Formula V:

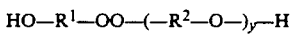

$$HO-R^1-OO-(-R^2-O-)_y-H \qquad V$$

with one or more of a difunctional condensation monomer or polyfunctional condensation monomer, wherein the condensation monomer is co-reactive with hydroxy and/or hydroperoxy groups contained in Formula V.

The preparation reaction may optionally also take place in the presence of one or more of a diol, polyol, diamine, polyamine, amino alcohol and polyfunctional amino alcohol and/or an optional monofunctional molecular weight regulator, wherein the condensation monomer is also co-reactive with the hydroxy or amine groups of the optional diol, polyol, diamine, polyamine, amino alcohol and/or optional monofunctional molecular weight regulator.

The co-reactive difunctional condensation monomer and polyfunctional condensation monomer are independently selected from one or more of a carbonate precursor, urea precursor, diester precursor, polyester precursor, diamide precursor, polyamide precursor, diurethane precursor or polyurethane precursor.

Non-limiting examples of reactants used for preparing the novel polymeric peroxides of the present invention include the following:

(1) Suitable hydroxy-hydroperoxides of Formula V include 3-hydroxy-1,1-dimethylpropyl hydroperoxide, 3-hydroxy-1,1-dimethylbutyl hydroperoxide, 1-ethyl-3-hydroxy-1-methylpentyl hydroperoxide, 1,1-diethyl-3-hydroxybutyl hydroperoxide and 5-hydroxy-1,3,3-trimethylcyclohexyl hydroperoxide.

(2) Suitable dihydroxy-dialkyl peroxides of Formula V include di-(3-hydroxy-1,1-dimethylpropyl) peroxide, di-(3-hydroxy-1,1-dimethylbutyl) peroxide and di-(1-ethyl-3-hydroxy-1-methylpentyl) peroxide.

(3) Suitable presently preferred basic catalysts include one or more of triethylamine, tributylamine, N,N-dimethylaniline, pyridine, N,N-dimethyl-4-aminopyridine (DMAP), 1-azabicyclo-(2.2.2)octane, 1,4-diazabicylo(2.2.2)octane, 1,8-diazabicyclo(5.3.0)undec-7-ene, sodium hydroxide, sodium carbonate, sodium hydrogen carbonate, potassium hydroxide, potassium carbonate, potassium hydrogen carbonate, calcium hydroxide, barium hydroxide, magnesium hydroxide, calcium carbonate and trisodium phosphate.

In the cases where the co-reactive di- or polyfunctional condensation monomers are diurethane precursors (i.e., diisocyanates), the optional catalysts can also be one or more of a Lewis acid, such as methanesulfonic acid, and p-methylphenylsulfonic acid and metal compounds, such as di-n-butyltin diacetate, di-n-butyltin dioctoate, di-n-butyltin dilaurate, phenyllead triacetate, acetylacetonates of iron, vanadium, copper, chromium, cobalt and manganese and carboxylates of calcium, lead, manganese, zinc, zirconium and cobalt. Although the acetylacetonates and carboxylates of transition metals may be used in reactions with dihydroxy-dialkyl peroxides (i.e., Formula V where y is 1), the acetylacetonates and carboxylates of transition metals should be avoided in reactions with hydroxyhydroperoxides (i.e., Formula V where y is 0), owing to the rapid transition metal catalyzed decompositions of hydroperoxides.

(4) Suitable optional diols and polyols include dihydric phenols and polyhydric phenols which are normally used for preparing polyarylates and polycarbonates, such as 1,3-dihydroxybenzene (resorcinol), 1,4-dihydroxybenzene (hydroquinone), 2-sulfo-1,4-hydroquinone, pentadecylresorcinol, Bisphenol-A (2,2-di-(4-hydroxyphenyl)propane), 4,4'-dihydroxydiphenyl, di-(4-hydroxyphenyl)methane, 1,1-di-(4-hydroxyphenyl)cyclohexane, di-(4-hydroxyphenyl) sulfide, di-(4-hydroxyphenyl) sulfoxide, di-(4-hydroxyphenyl) sulfone, 2,2-di-(3,5-dichloro-4-hydroxyphenyl)propane, 2,2-di-(3,5-dibromo-4-hydroxyphenyl)propane, 2,2-di-(3,5-dimethyl-4-hydroxyphenyl)propane, 2,2-di-(4-hydroxyphenyl)-1,1,1,3,3,3-hexafluoropropane, phenolphthalein, di-(4-hydroxyphenyl) ketone, di-(4-hydroxyphenyl) ether and aliphatic dihydroxy compounds and polyhydroxy compounds, such as ethylene glycol, diethylene glycol, triethylene glycol, 1,2- and 1,3-propylene glycols, 1,2-, 1,3- and 1,4-butylene glycols, 1,6-hexanediol, 1,10-decamethylene glycol, 2,2-dimethyl-1,3-propanediol (neopentyl glycol), 2-buten-1,4-diol, 2-butyn-1,4-diol, 2,4,4-trimethyl-1,3-pentanediol, 1,4-cyclohexanediol, 1,4-cyclohexanedimethanol, glycerin, trimethylol propane and pentaerythritol.

Other suitable optional diols and polyols include dihydroxy-terminated polybutadiene polymers and oligomers, poly(ethylene glycol) oligomers and polymers, poly(propylene glycol) oligomers and polymers, poly(ethylene glycol-block-propylene glycol) oligomers and polymers, poly(tetramethylene glycol) oligomers and polymers and polycaprolactone oligomers and polymers, such as oligomeric caprolactone diols and triols, commercially available from Union Carbide Corp. under the registered trademark TONE ®.

(5) Suitable optional diamines and polyamines include aromatic diamines, such as 1,3- and 1,4-phenylenediamines, 4,4'-diaminodiphenyl, di-(4-aminophenyl) ether, di-(4-aminophenyl) sulfide, di-(4-aminophenyl)methane and aliphatic diamines, such as ethylenediamine, hexamethylenediamine, 1,8-diaminooctane, 1,12-diaminododecane, 1,4-cyclohexanedimethylamine and piperazine. Other suitable diamines include the oligomeric diamines sold by Texaco, Inc. under the registered trademark JEFFAMINE ®.

(6) Suitable optional difunctional amino alcohols and polyfunctional amino alcohols include ethanolamine, propanolamine, diethanolamine, dipropanolamine, 2,2-dimethyl-3-aminopropanol, p-aminophenol and m-aminophenol.

(7) Suitable optional monofunctional molecular weight regulators include monohydric phenols, such as phenol, 4-sulfophenol, 4-chlorophenol, 4-bromophenol, 2,4,6-tribromo-phenol, 4-cresol, 4-t-butylphenol, 4-cumylphenol, 4-dodecylphenol, 3-pentadecylphenol and the corresponding chlorocarbonate esters, such as methyl chloroformate, 2-ethylhexyl chloroformate, phenyl chloroformate, 1,3-dimethyl-3-(t-butylperoxy)-butyl chloroformate, monoamino compounds, such as n-butylamine, t-butylamine, cyclohexylamine, aniline, N-methylaniline, and p-toluidine; and oligomeric monoamines sold by Texaco, Inc. under the registered trademark JEFFAMINE ®, mono acid chlorides and bromides, such as butyryl chloride, 2-ethylhexanoyl chloride, lauroyl chloride, benzoyl chloride, benzoyl bromide, 2-naphthoyl chloride, 4-(t-butyl)benzoyl chloride, 3-(t-butylperoxycarbonyl)propionyl chloride and 2-(t-butylperoxycarbonyl)benzoyl chloride; acid anhydrides, such as acetic anhydride, succinic anhydride, maleic anhydride and phthalic anhydride and monoisocyanates, such as methyl isocyanate and phenyl isocyanate.

Performance additive derivatives (e.g., UV stabilizers, antioxidants, etc.) with co-reactive monofunctional groups can also be used as monofunctional molecular weight regulators. Suitable compounds include 2-(4-benzoyl-3-hydroxyphenoxy)ethanol, 2-(4-benzoyl-3-hydroxyphenoxy)propanol, 2-(4-(2H-benzotriazol-2-yl)-3-hydroxyphenoxy)ethanol, 2-cyano-3,3-diphenylpropenoyl chloride, 2-(4-benzoyl-3-hydroxyphenoxy)ethyl chloroformate, 2-(4-benzoyl-3-hydroxyphenoxy)propyl chloroformate, (4-benzoyl-3-hydroxyphenoxy)acetyl chloride, 2-(4-benzoyl-3-hydroxyphenoxy)propionyl chloride, 2-(4-(2H-benzo-triazol-2-yl)-3-hydroxyphenoxy)ethyl chloroformate, 2-(3-(2H-benzotriazol- 2-yl)-4-hydroxyphenoxy)ethyl chloroformate, 4-(2H-benzotriazol-2-yl)-3-hydroxyphenoxyacetyl chloride, 3-(2H-benzotriazol-2-yl)-4-hydroxyphenoxyacetyl chloride, dimethyl 4-(2-chlorocarbonyloxyethoxy)benzylidene malonate, diethyl 4-(2-chlorocarbonyloxyethoxy)benzylidene malonate, dipropyl 4-(chlorocarbonylmethoxy)benzylidene malonate, 3,5-di-t-butyl-4-hydroxybenzoyl chloride, 3-(3,5-di-t-butyl-4-hydroxyphenyl)propionyl chloride, 2,2,6,6-tetramethyl-4-piperidinyl chloroformate, 1,2,2,6,6-pentamethyl-4-piperidinyl chloroformate, 2,2,6,6-tetramethyl-4-piperidinol and 1,2,2,6,6-pentamethyl-4-piperidinol.

(8) Suitable carbonate and urea precursors include phosgene, carbonyl bromide, bischloroformates, such as Bisphenol-A bischloroformate, ethylene glycol bischloroformate and diethylene glycol bischloroformate, and polyhaloformates, such as pentaerythritol tetrachloroformate.

(9) Suitable diester and diamide precursors include diacid halides and polyacid halides, for example, isophthaloyl chloride, terephthaloyl chloride, 4-t-butylisophthaloyl chloride, 2,6-dichlorocarbonylnaphthalene, pyromellitic dianhydride, trimellitic anhydride, trimellitic anhydride acid chloride, succinyl chloride, adipoyl chloride, sebacoyl chloride, dodecanedioyl dichloride and suberoyl chloride.

(10) Suitable diurethane and diurea precursors include diisocyanates and polyisocyanates, for example, toluene-2,4-diisocyanate and toluene-2,6-diisocyanate and mixtures thereof (TDI), 1,5-naphthalene diisocyanate (NDI), 4,4'-methylenebis(phenylisocyanate) (MDI), 1,3- and 1,4-di-(1-isocyanato-1-methylethyl)-benzenes, polymeric isocyanates obtained by the phosgenation of polyamines which in turn are produced from aniline and formaldehyde (PMDI), hexamethylene diisocyanate (HDI), trimethylhexamethylene diisocyanate (TMDI), isophorone diisocyanate (IPDI), methylenebis(cyclohexyl isocyanate), 1,3- and 1,4-bis-(isocyanato-methyl)cyclohexanes, p-xylylene diisocyanates and other diisocyanates and polyisocyanates as disclosed in *The Kirk-Othmer Encyclopedia of Chemical Technology*, Third Edition, "Urethane Polymers," (Henri Ulrich), pp. 576–608.

Several synthetic methods are available for preparing the novel polymeric peroxides of this invention in the presence or absence of a solvent. Suitable types of solvents include, for example, water, ketones, esters, amides, ethers, aliphatic hydrocarbons, aromatic hydrocarbons, halogenated aliphatic hydrocarbons and halogenated aromatic hydrocarbons. Illustrative preferred solvents include, for example, water, methylene chloride, tetrahydrofuran and chlorobenzene.

The synthesis methods may include reactions in the presence or absence of a catalyst and/or a monofunctional molecular weight regulator. The reactions occur at temperatures from about −10° C. to about 120° C., and preferably, from about 0° C. to about 100° C.

The specific techniques may be determined readily by a chemist of ordinary skill in the art by reference to standard works in the chemical literature, if necessary, in addition to the following general methods and specific working examples. Variations in techniques due to specific reactants, etc., may be readily determined based on the present disclosure without undue experimentation.

Novel polyester peroxides of the present invention may be prepared by reacting the hydroxyhydroperoxides and the dihydroxy-dialkyl peroxides of Formula V with suitable diester precursors, along with optional diols and other optional reactants.

Novel polyamide peroxides of the present invention may be prepared by reacting the hydroxyhydroperoxides and the dihydroxy-dialkyl peroxides of Formula V and diamines, with suitable diamide precursors, along with other optional reactants.

Novel polyurethane peroxides of the present invention may be prepared by reacting the hydroxyhydroperoxides and the dihydroxy-dialkyl peroxides of Formula V, with suitable diurethane precursors (e.g., diisocyanates) in the presence or absence of diols and other optional reactants.

Novel polyurea peroxides of the present invention may be prepared by reacting the hydroxyhydroperoxides and the dihydroxy-dialkyl peroxides of Formula V and diamines, with suitable urea precursors (e.g., phosgene) and/or diurea precursors (e.g., diisocyanates) in the presence or absence of optional reactants.

Novel polycarbonate peroxides of the present invention may be prepared by reacting the hydroxyhydroperoxides or the dihydroxy-dialkyl peroxides of Formula V, with suitable carbonate precursors along with other optional reactants.

Another synthesis route to both the novel polyester peroxides and the novel polycarbonate peroxides of this invention is via ester interchange or transesterification. In this route, a diester of a dicarboxylic acid (e.g., dimethyl isophthalate or dimethyl terephthalate) is the diester precursor for the polyester peroxide and a dialkyl carbonate (e.g., dimethyl carbonate, diethyl carbonate or diphenyl carbonate) is the carbonate precursor for the polycarbonate peroxide. The other raw starting materials are the same as those described hereinbefore, except that an ester interchange catalyst is employed instead of a basic catalyst. Non-limiting examples of suitable ester interchange catalysts include alkali metal alkoxides, such as sodium methoxide, and tetraalkyl titanates, such as tetrapropyl titanate.

Utility of The Polymeric-Peroxides

I. Polymerization of Ethylenically Unsaturated Monomers

In the polymerizations of ethylenically unsaturated monomers at suitable temperatures, the novel polymeric peroxides of the present invention can be used to initiate free radical polymerization of the ethylenically unsaturated monomers.

Suitable ethylenically unsaturated monomers include olefins, such as ethylene, propylene, styrene, alpha-methylstyrene, p-methylstyrene, chlorostyrenes, bromostyrenes, vinylbenzyl chloride, vinylpyridine and divinylbenzene; diolefins, such as 1,3-butadiene, isoprene and chloroprene; vinyl esters, such as vinyl acetate, vinyl propionate, vinyl laurate, vinyl benzoate and divinyl carbonate; unsaturated nitriles, such as acrylonitrile and methacrylonitrile; acrylic acid and methacrylic acid and their anhydrides; esters and amides, such as acrylic acid anhydride, methyl, ethyl, n-butyl, 2-hydroxyethyl, lauryl and 2-ethylhexyl acrylates and methacrylates, acrylamide and methacrylamide; maleic anhydride, itaconic anhydride, maleic, itaconic and fumaric acids and their esters; vinyl halogen and vinylidene dihalogen compounds, such as vinyl chloride, vinyl bromide, vinyl fluoride, vinylidene chloride and vinylidene fluoride; perhalogen olefins, such as tetrafluoroethylene, hexafluoropropylene and chlorotrifluoroethylene; vinyl ethers, such as methyl vinyl ether, ethyl vinyl ether and n-butyl vinyl ether; allyl esters, such as allyl acetate, allyl benzoate, allyl ethyl carbonate, triallyl phosphate, diallyl phthalate, diallyl fumarate, diallyl glutarate, diallyl adipate, diallyl carbonate, diethylene glycol bis(allyl carbonate) (ADC); acrolein; methyl vinyl ketone and mixtures of such ethylenically unsaturated monomers.

Temperatures of about 0° C. to about 250° C., preferably about 30° C. to about 200° C. and polymeric peroxide levels of about 0.05% to about 75% by weight based on the weight of the ethylenically unsaturated monomer, preferably about 0.10% to about 60% by weight based on the weight of the ethylenically unsaturated monomer, are typically used in conventional polymerizations and copolymerizations of ethylenically unsaturated monomers. The polymeric peroxides of the present invention can be used in combination with other free radical initiators, such as those disclosed at the bottom of column 4 and the top of column 5 of U.S. Pat. No. 4,525,308. Using the polymeric peroxides of the present invention in combination with these free radical initiators adds flexibility to the processes of polymer manufacturers and allows for "fine tuning" of polymerization processes. Mixtures of two or more polymeric peroxides can also be used if desired.

II. Curing of Unsaturated Polyester Resins

In the curing of unsaturated resin compositions by heating the unsaturated resin compositions at suitable curing temperatures, the polymeric peroxides of the present invention exhibit curing activity as free radical curing agents for the curable unsaturated polyester resin compositions. Unsaturated polyester resins that can be cured by the polymeric peroxides of this invention usually include an unsaturated polyester and one or more of an ethylenically unsaturated monomer.

The unsaturated polyesters are, for example, polyesters as obtained by esterifying at least one ethylenically unsaturated dicarboxylic acid, polycarboxylic acid, anhydride or acid halide, such as maleic acid, fumaric acid, glutaconic acid, itaconic acid, mesaconic acid, citraconic acid, allylmalonic acid and tetrahydrophthalic acid, their anhydrides and halides; with saturated and unsaturated diols and saturated and unsaturated polyols, such as ethylene glycol, diethylene glycol, triethylene glycol, 1,2- and 1,3-propanediols, 1,2-, 1,3- and 1,4-butanediols, 2,2-dimethyl-1,3-propanediol, 2-hydroxymethyl-2-methyl-1,3-propanediol, 2-buten-1,4-diol, 2-butyn-1,4-diol, 2,4,4-trimethyl-1,3-pentanediol, glycerol, penta-erythritol and mannitol. Mixtures of such diacids, polyacids, diols and polyols may also be used.

The ethylenically unsaturated dicarboxylic acids and ethylenically unsaturated polycarboxylic acids may be partially replaced by saturated dicarboxylic acids and saturated polycarboxylic acids, such as adipic acid, succinic acid, sebacic acid and others; and by aromatic dicarboxylic acids and aromatic polycarboxylic acids, such as phthalic acid, trimellitic acid, pyromellitic acid, isophthalic acid and terephthalic acid. The unsaturated or saturated acids used may be substituted, for example, by halogen. Examples of such suitable halogenated acids are, for example, tetrachlorophthalic acid, tetrabromophthalic acid and 5,6-dicarboxy-1,2,3,4,7,7-hexachlorobicyclo-(2.2.1)-2-heptene.

The other component of the unsaturated polyester resin composition, the polymerizable monomer or monomers, are preferably ethylenically unsaturated monomers, such as styrene, alpha-methylstyrene, p-methylstyrene, chlorostyrenes, bromostyrenes, vinylbenzyl chloride, divinylbenzene, diallyl maleate, dibutyl fumarate, triallyl phosphate, triallyl cyanurate, diallyl phthalate, diallyl fumarate, methyl acrylate, methyl methacrylate, n-butyl acrylate, n-butyl methacrylate, ethyl acrylate, or mixtures thereof, which are copolymerizable with the unsaturated polyesters.

Preferably, the unsaturated polyester resin composition contains, as the unsaturated polyester component, the esterification product of 1,2-propanediol, maleic anhydride and phthalic anhydride as well as the monomer component, styrene.

Other types of unsaturated polyester resin compositions can be cured at suitable temperatures using the polymeric peroxides of the present invention as curing catalysts. These resins, generally known in the art as unsaturated vinyl ester resins, consist of a vinyl ester resin portion and one or more of a polymerizable monomer component. The vinyl ester resin component can be made by reacting a chloroepoxide, such as epichlorohydrin, with an appropriate amount of a bisphenol, such as Bisphenol-A (2,2-bis(4-hydroxyphenyl)propane), in the presence of a base, such as sodium hydroxide, to yield a condensation product having terminal epoxy groups derived from the chloroepoxide. Subsequent reaction of the condensation product with polymerizable unsaturated carboxylic acids, such as acrylic acid and methacrylic acid, in the presence or absence of acidic or basic catalysts, results in formation of the vinyl ester resin component. Normally, styrene is added as the polymerizable monomer component to complete the preparation of the unsaturated vinyl ester resin composition.

Temperatures of about 20° C. to about 200° C. and polymeric peroxide levels of about 0.2% to about 50% or more, based on weight of curable unsaturated polyester resin composition, are normally used.

The unsaturated polyester resin compositions described above can be filled with various materials, for example, sulfur, glass, carbon and boron fibers, carbon black, silicas, metal silicates, clays, metal carbonates, antioxidants (AO), heat, ultraviolet (UV) and light stabilizers, sensitizers, dyes, pigments, accelerators, metal oxides, such as zinc oxide, blowing agents and nucleating agents.

III. Curing of Elastomers and Crosslinking of Thermoplastic Polymers

The polymeric peroxides of the present invention are also useful as curing agents for curing elastomeric compositions and as crosslinking agents for crosslinking polymer compositions by heating the elastomeric composition at suitable curing temperatures and the polymeric compositions at suitable crosslinking temperatures.

Elastomeric resin compositions that can be cured by the polymeric peroxides of this invention include elastomers, such as ethylene-propylene copolymers (EPR), ethylene-propylene-diene terpolymers (EPDM), polybutadiene (PBD), silicone rubber (SR), nitrile rubber (NR), neoprene, fluoroelastomers and ethylene-vinyl acetate copolymer (EVA).

Polymer compositions that can be crosslinked by the polymeric peroxides of this invention include olefin thermoplastics, such as chlorinated polyethylene (CPE), low density polyethylene (LDPE), linear-low density polyethylene (LLDPE) and high density polyethylene (HDPE).

Temperatures of about 80° C. to about 310° C. and polymeric peroxide levels of about 0.2% to about 50% or more, preferably about 0.25% to about 40%, based on weight of curable elastomeric resin composition or crosslinkable olefin polymer composition, are normally used.

The curable elastomeric resin composition or crosslinkable polymer composition can be optionally filled with the materials listed hereinbefore for use with the conventional, unsaturated polyester resin compositions.

IV. Modification of Polypropylene and Propylene Copolymers

The polymeric peroxides of the present invention can be used in processes for modifying polypropylene (PP) and propylene copolymers (e.g., the beneficial degradation of polypropylene by reducing the polymer molecular weight and modifying the molecular weight distribution, for example) at suitable temperatures.

Temperatures of about 140° C. to about 340° C. and polymeric peroxide levels of about 0.2% to about 15.0%, based on weight of modifiable polypropylene or propylene copolymers, are normally used. Optionally, up to about 1% by weight of molecular oxygen can be used as a modification co-catalyst.

V. Other Utilities of Polymeric-Peroxides

The novel polymeric peroxides of the present invention have utilities in several other applications.

The novel polymeric peroxides can be used to prepare block copolymers by several techniques. A block copolymer can be made by using the polymeric peroxides of this invention as a macro initiator to initiate polymerization of one or more ethylenically unsaturated monomers, such as those listed hereinbefore. A block copolymer consisting of a condensation polymer block and one or two addition polymer blocks derived from polymerization of the ethylenically unsaturated monomer is thereby obtained.

A block copolymer of two or more monomers that are not the same as the monomers of the polymeric peroxide can be made by partially decomposing the polymeric peroxide in the presence of one monomer followed by decomposing in the presence of a second monomer, and so on. The latter processes can be carried out in solution or in polymer processing equipment, such as an extruder. Such block copolymers have utility in compatibilizing homopolymer and copolymer blends and alloys.

The polymeric peroxides can also be used in reactive processing to compatibilize polymers in situ by forming block and graft copolymers in polymer processing equipment, such as extruders, roll mills, etc. The polymeric peroxides can also be used to enhance the quality of an interpenetrating polymer network (IPN) in polymer processing equipment. The polymeric peroxides can also be used in reactive processing to enhance the impact resistance of polymer blends. The polymeric peroxides also have utility as polymeric low profile/low shrink curing agents, as self-curing polymeric systems and as self-degrading polymer systems. The polymeric peroxides can also be used as non-fugitive, polymer compatible, flame retardant synergists for styrene polymers. Additionally, the polymeric peroxides provide very useful polymer peroxide masterbatches (i.e., polymer-peroxide compositions with 5% or more organic peroxides, useful in crosslinking, curing and polymer modification applications), since the peroxide functions are covalently attached and thereby compatible with the polymer backbone and cannot bloom, exude or volatilize.

The present invention will now be described in more detail with reference to the following specific, non-limiting examples.

In general, the recurring or repeating units of Formula I and Formula IV in the following examples were named according to the nomenclature for the polymeric repeating units or the constituted repeating units (CRU) of polymers as outlined in the Nomenclature Rules—Units Section (pp. I-1 to I-13) of the *Polymer Handbook*, Second Edition, J. Brandrup and E. H. Immergut, Editors, John Wiley and Sons, New York, 1975. For consistency in naming the structures of the recurring units of Formula I and Formula IV, the subunits within the recurring or repeating units were named from left to right without regard to "seniority" of the subunit.

Non-limiting examples of some of the recurring units of Formula I and Formula IV used in the following examples have the following illustrated structures A through H, and are also identified by the corresponding names of the recurring units. In the structures, subunits within the recurring units have been separated from each other with dashes to aid in identifying and naming the subunits.

Structure A (of Formula I)

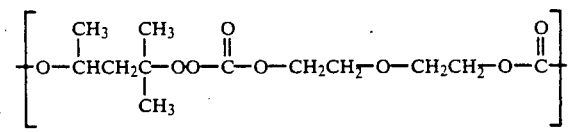

Name of Recurring Unit: Oxy-(1,3,3-trimethyltrimethylene)-dioxycarbonyloxyethyleneoxyethyleneoxycarbonyl In naming Structure A, the first "oxy" refers to the left-most —O— subunit. The next subunit, named "1,3,3-trimethyltrimethylene", refers to the structure

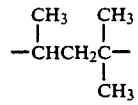

in which the carbons of the trimethylene group are numbered 1 to 3 from left to right; "dioxy" refers to the —OO— structure; "carbonyl" refers to —(C=O)—, "oxy" refers to the next —O—; "ethylene" refers to the first —CH₂CH₂— group; "oxy" refers to the next —O—; "ethylene" refers to the next —CH₂CH₂— group; "oxy" refers to the next —O—; and "carbonyl" refers to the right-most —(C=O)—.

Examples of other recurring or repeating unit structures are given and named below:

Structure B (of Formula I)

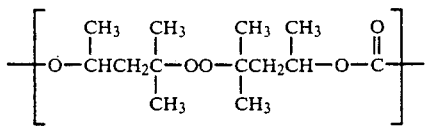

Name of Recurring Unit: Oxy-(1,3,3-trimethyl-trimethylene)dioxy-(1,1,3-trimethyltrimethylene)oxycarbonyl Structure C (of Formula I)

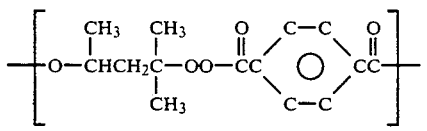

Name of Recurring Unit: Oxy-(1,3,3-trimethyltrimethylene)dioxyterephthaloyl

Structure D (of Formula I)

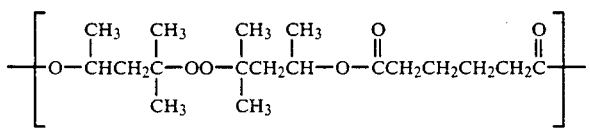

Name of Recurring Unit: Oxy-(1,3,3-trimethyl-trimethylene)dioxy-(1,1,3-trimethyltrimethylene)oxyadipoyl Structure E (of Formula I)

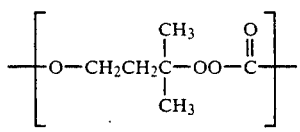

Name of Recurring Unit: Oxy-(3,3-dimethyltrimethylene)-dioxycarbonyl

Structure F (of Formula I)

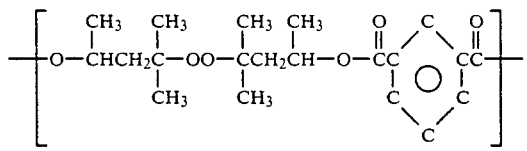

Name of Recurring Unit: Oxy-(1,3,3-trimethyltrimethylene)dioxy-(1,1,3-trimethyltrimethylene)oxyisophthaloyl Structure G (of Formula IV)

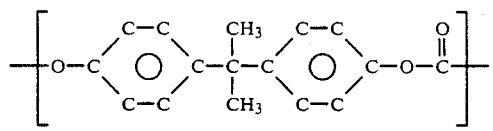

Name of Recurring Unit: Oxy-1,4-phenylene-(1-methylethylidene)-1,4-phenyleneoxycarbonyl Structure H (of Formula IV)

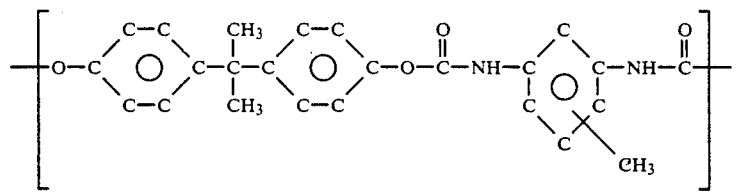

Name of Recurring Unit: Oxy-1,4-phenylene-(1-methylethylidene)-1,4-phenyleneoxycarbonylimino(x-methyl-1,3-phenylene)iminocarbonyl Based on the foregoing examples showing the relationship of the names and structures of the recurring units, subunit names and their left-to-right sequence, the structure of other recurring units can be reconstituted in view of their names. For example, the named recurring unit, oxy-(1,3,3-trimethyltrimethylene)dioxy-(1,1,3-trimethyltrimethylene)oxycarbonylimino-(x-methyl-1,3-phenylene)iminocarbonyl, has the following Structure J (of Formula I):

Structure J (of Formula I)

-continued

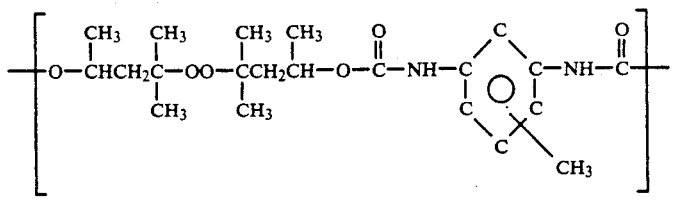

EXAMPLE 1

Preparation of a Peroxy-Containing Bisphenol-A co-Polycarbonate derived from Phosgene, Diethylene Glycol Bischloroformate, Bisphenol-A and 3-Hydroxy-1,1-dimethylbutyl Hydroperoxide In the polymeric peroxide of this example, the recurring unit of Formula I was oxy-(1,3,3-trimethyltrimethylene)dioxycarbonyloxyethyleneoxyethyleneoxycarbonyl (Structure A) and the recurring units of Formula IV were (a) oxy-1,4-phenylene-(1-methylethylidene)-1,4-phenyleneoxycarbonyl (Structure G) and (b) oxy-1,4-phenylene-(1-methylethylidene)-1,4-phenyleneoxycarbonyloxyethyleneoxyethyleneoxycarbonyl (Structure not illustrated.)

A 2 liter 4-necked flask equipped with a mechanical stirrer, a thermometer, a Dry Ice reflux condenser and a Dry Ice cooled addition funnel was charged with pyridine (12.0 g, 0.15 mole), 3-hydroxy-1,1-dimethylbutyl hydroperoxide (0.68 g, 0.005 mole) and 250 mL of methylene chloride. To the resulting solution was added diethylene glycol bischloroformate (6.94 g, 0.03 mole) at 8°-12° C. over a period of 15 minutes. The reaction mass was then stirred for 1 hour at 8°-12° C. to complete the first stage of the reaction. To the resulting reaction mass was added 2,2-bis(4-hydroxyphenyl)propane (Bisphenol-A) (21.7 g, 0.095 mole), pyridine (12.0 g, 0.15 mole) and 550 mL of methylene chloride. To the resulting vigorously stirred reaction mass was added phosgene (10.0 g, 0.10 mole) over a period of 30 minutes at 10° C. Agitation of the reaction mass was continued for an additional 2 hours. The reaction temperature was allowed to rise to 24° C. during this period of agitation. 4-Cumylphenol (1.06 g, 0.005 mole) was then added and the reaction mixture was further stirred for 30 minutes at 24° C. 4-Cumylphenol was used in this example as a monofunctional molecular weight regulator (i.e., an end-capping agent and a chain stopper).

The reaction mass was poured into 1000 mL of vigorously stirred water and the methylene chloride layer was washed with 6% aqueous NaHCO3, 3% aqueous HCl and water to obtain a pH of about 7. After drying the methylene chloride phase over 10% by weight of anhydrous magnesium sulfate and separating the spent desiccant by filtration, the methylene chloride solution was poured into 1000 mL of cold methanol to precipitate the polymeric peroxide. The resulting polymer was washed several times with fresh methanol followed by drying in a vacuum oven at 25° C. A white solid resin was obtained (30 g, 95% of theory, uncorrected) having an active oxygen content of 0.45%. Gel permeation chromatography (GPC) using polystyrene calibration standards indicated that the number average molecular weight (Mn) of the product polymer was 5100, the weight average molecular weight (Mw) of the product polymer was 7800 and the molecular weight distribution (Mw/Mn) of the product polymer was 1.53. The intrinsic viscosity of the product as measured in chloroform solution at 25° C. was 0.14 dL/g.

A differential scanning calorimetry (DSC) scan on the product polymer showed a peroxide decomposition exotherm at 172° C. and a glass transition temperature (Tg) of 74° C. The polymer product data confirmed that the product was the desired peroxy-containing bisphenol-A copolycarbonate.

The preparation of this peroxy-containing bisphenol-A co-polycarbonate was repeated, tripling the quantities of raw materials. After the above process and work-up, 89.0 g of a white resin was obtained which had an active oxygen content of 0.62%. Gel permeation chromatography (GPC) using polystyrene calibration standards showed that the number average molecular weight (Mn) of the product polymer was 12,000, the weight average molecular weight (Mw) of the product polymer was 29,000 and the molecular weight distribution (Mw/Mn) of the product polymer was 2.42.

A DSC scan on the product polymer showed a peroxide decomposition exotherm at 165° C. and a glass transition temperature (Tg) of 74° C.

Based on the various recurring units in the product polymeric peroxide from the first product of this example, the average unit weight (UW) of the product polymeric peroxide was ca. 275, there was a total of about 20 recurring units per polymer chain and there was about 1 peroxide recurring unit per polymer chain. Based on the various recurring units in the polymeric peroxide from the second product of this example, the average unit weight (UW) of the product polymeric peroxide was ca. 275, there was a total of about 45 recurring units per polymer chain and there were about 5 peroxide recurring units per polymer chain.

EXAMPLE 2

Preparation of a Peroxy-Containing Bisphenol-A Polycarbonate derived from Phosgene, Bisphenol-A and Di-(3-hydroxy-1,1-dimethylbutyl) Peroxide In the polymeric peroxide of this example, the recurring unit of Formula I was oxy-(1,3,3-trimethyltrimethylene)dioxy-(1,1,3-trimethyltrimethylene)oxycarbonyl (Structure B) and the recurring unit of Formula IV was oxy-1,4-phenylene-(1-methylethylidene)-1,4-phenyleneoxycarbonyl (Structure G).

A 2 liter 4-necked flask equipped with a mechanical stirrer, a thermometer, a Dry Ice reflux condenser, and a Dry Ice cooled addition funnel was charged with 2,2-bis(4-hydroxyphenyl)propane (Bisphenol-A) (21.6 g, 0.095 mole), di-(3-hydroxy-1,1-dimethylbutyl) peroxide (1.18 g, 0.005 mole), pyridine (24.0 g, 0.30 mole) and 800 mL of methylene chloride. To the resulting vigorously stirred solution at 8°-10° C. was added liquid phosgene (12.9 g, 0.13 mole) over a period of 30 minutes. The reaction mass was then stirred for 3 hours at 10°-12° C. after which 4-cumylphenol (1.06 g, 0.005 mole) was added and the reaction mixture was further stirred for 30 minutes at 10°-12° C. 4-Cumylphenol was used as a monofunctional molecular weight regulator (i.e., an end-capping agent and a chain stopper).

The reaction mass was then poured into 1000 mL of vigorously stirred water and the lower methylene chloride layer was washed with 6% aqueous $NaHCO_3$, 3% aqueous HCl and water to obtain a pH of about 7. After drying over 10% by weight of anhydrous magnesium sulfate and separating the spent desiccant by filtration, the methylene chloride solution was poured into 1000 mL of cold methanol to precipitate the polymeric peroxide. The resulting polymer was washed several times with fresh methanol and subsequently dried in a vacuum oven at 25° C. 26 g of a white solid resin was obtained having an active oxygen content of 0.10%. Gel permeation chromatography (GPC) using polystyrene calibration standards indicated that the number average molecular weight (Mn) of the product polymer was 11,000, the weight average molecular weight (Mw) of the product polymer was 38,000 and the molecular weight distribution (Mw/Mn) of the product polymer was 3.45. The intrinsic viscosity of the product as measured in chloroform solution at 25° C. was 0.28 dL/g.

A DSC scan on the product polymer showed a peroxide decomposition exotherm at 210° C. and a glass transition temperature (Tg) of 117° C. The polymer product data confirmed that the product was the desired peroxy-containing bisphenol-A polycarbonate.

Based on the various recurring units in the product polymeric peroxide, the average unit weight (UW) of the product polymeric peroxide was ca. 250, there was a total of about 45 recurring units per polymer chain and there were 0.69 peroxide recurring units per polymer chain. The product was a mixture of novel polymeric peroxide and non-peroxide-containing polymers.

EXAMPLE 3

Preparation of a Peroxy-Containing Bisphenol-A co-Polycarbonate derived from Phosgene, Diethylene Glycol Bischloroformate, Bisphenol-A and 3-Hydroxy-1,1-dimethylbutyl Hydroperoxide In the polymeric peroxide of this example, the recurring unit of Formula I was oxy-(1,3,3-trimethyltrimethylene)dioxycarbonyloxyethyleneoxyethyleneoxycarbonyl (Structure A) and the recurring units of Formula IV were (a) oxy-1,4-phenylene-(1-methylethylidene)-1,4-phenyleneoxycarbonyl (Structure G) and (b) oxy-1,4-phenylene-(1-methylethylidene)-1,4-phenyleneoxycarbonyloxyethyleneoxyethyleneoxycarbonyl (Structure not illustrated).

The same procedure and the same quantities of reactants as used in Example 1 were used in this example except two monofunctional molecular weight regulators (i.e., end-capping agents and chain stoppers) were used instead of one. 4-Cumylphenol (0.0050 mole) and 2,4,6-tribromophenol (0.0025 mole) were used as the monofunctional molecular weight regulators. 2,4,6-Tribromophenol also afforded the resulting polymeric peroxide with a degree of flame retardance.

22 g of a white solid resin was obtained after work-up having an active oxygen content of 0.22% and a bromine content of 2.76%. This indicated that the product polymeric peroxide possessed both covalently attached peroxide functionalities and covalently attached bromine functionalities. Gel permeation chromatography (GPC) using polystyrene calibration standards indicated that the number average molecular weight (Mn) of the product polymer was 6400. The intrinsic viscosity of the product as measured in chloroform solution at 25° C. was 0.25 dL/g.

A DSC scan on the product polymer showed a peroxide decomposition exotherm at 169° C. and a glass transition temperature (Tg) of 85° C. The polymer product data confirmed that the product was the desired peroxy-containing bisphenol-A co-polycarbonate.

Based on the various recurring units in the product polymeric peroxide, the average unit weight (UW) of the product polymeric peroxide was ca. 275, there was a total of about 25 recurring units per polymer chain and there was about 1 peroxide recurring unit per polymer chain.

EXAMPLE 4

Preparation of a Peroxy-Containing Bisphenol A co-Polycarbonate derived from Phosgene, Diethylene Glycol Bischloroformate, Bisphenol-A and 3-Hydroxy-1,1-dimethylbutyl Hydroperoxide In the polymeric peroxide of this example, the recurring unit of Formula I Was oxy-(1,3,3-trimethyltrimethylene)dioxycarbonyloxyethyleneoxyethyleneoxycarbonyl (Structure A) and the recurring units of Formula IV were (a) oxy-1,4-phenylene-(1-methylethylidene)-1,4-phenyleneoxycarbonyl (Structure G) and (b) oxy-1,4-phenylene-(1-methylethylidene)-1,4-phenyleneoxycarbonyloxyethyleneoxyethyleneoxycarbonyl (Structure not illustrated).

The same procedure and the same quantities of reactants as used in Example 1 were used in this example except two monofunctional molecular weight regulators (i.e., end-capping agents and chain stoppers) were used instead of one. 4-Cumylphenol (0.0050 mole) and 3,5-di-t-butyl-4-hydroxybenzoyl chloride (0.0025 mole) were used as the monofunctional molecular weight regulators. 3,5-Di-t-butyl-4-hydroxybenzoyl chloride also provided oxidative stability and light stability to the resulting polymeric peroxide.

28 g of a white solid resin was obtained after work-up having an active oxygen content of 0.46%. Gel permeation chromatography (GPC) using polystyrene calibration standards indicated that the number average molecular weight (Mn) of the product polymer was 7000.

A DSC scan on the product polymer showed a peroxide decomposition exotherm at 174° C. and a glass transition temperature (Tg) of 90° C. The polymer product data confirmed that the product was the desired peroxy-containing bisphenol-A co-polycarbonate Based on the various recurring units in the product polymeric peroxide, the average unit weight (UW) of the product polymeric peroxide was ca. 275, there was a total of about 25 recurring units per polymer chain and there were about 2 peroxide recurring units per polymer chain.

EXAMPLE 5

Preparation of a Peroxy-Containing Bisphenol-A Polycarbonate derived from Phosgene, Bisphenol-A and Di-(3-hydroxy-1,1-dimethylbutyl) Peroxide In the polymeric peroxide of this example, the recurring unit of Formula I was oxy-(1,3,3-trimethyltrimethylene)dioxy-(1,1,3-trimethyltrimethylene)oxycarbonyl (Structure B) and the recurring unit of Formula IV was oxy-1,4-phenylene-(1-methylethylidene)-1,4-phenyleneoxycarbonyl (Structure G).

The same procedure and the same quantities of reactants as used in Example 2 were used in this example except two monofunctional molecular weight regulators (i.e., end-capping agents and chain stoppers) were used instead of one. 4-Cumylphenol (0.0050 mole) and 2,4,6-tribromophenol (0.0025 mole) were used as the monofunctional molecular weight regulators. 2,4,6-Tribromophenol also afforded the resulting polymeric peroxide with a degree of flame retardance.

24 g of a white solid resin was obtained after work-up having an active oxygen content of 0.12% and a bromine content of 2.67%. This indicated that the product polymeric peroxide possessed both covalently attached peroxide functionalities and covalently attached bromine functionalities. Gel permeation chromatography (GPC) using polystyrene calibration standards indicated that the number average molecular weight (Mn) of the product polymer was 8600. The intrinsic viscosity of the product as measured in chloroform solution at 25° C. was 0.32 dL/g.

A DSC scan on the product polymer showed a peroxide decomposition exotherm at 205° C. and a glass transition temperature (Tg) of 116° C. The polymer product data confirmed that the product was the desired peroxy-containing Bisphenol-A polycarbonate.

Based on the various recurring units in the product polymeric peroxide, the average unit weight (UW) of the product polymeric peroxide was ca. 255, there was a total of about 35 recurring units per polymer chain and there were 0.65 peroxide recurring units per polymer chain. The product was a mixture of novel polymeric peroxide and non-peroxide containing polymers.

EXAMPLE 6

Preparation of a Peroxy-Containing Bisphenol-A Polycarbonate derived from Phosgene, Bisphenol-A and 3-Hydroxy-1,1-dimethylbutyl Hydroperoxide In the polymeric peroxide of this example, the recurring unit of Formula I was oxy-(1,3,3-trimethyltrimethylene)dioxycarbonyl (Structure not illustrated), and the recurring unit of Formula IV was oxy-1,4-phenylene-(1-methylethylidene)-1,4-phenyleneoxycarbonyl (Structure G).

The same procedure and the same reactants as used in Example 1 were used in this example except no diethylene glycol bischloroformate was used and 4-t-butylphenol was used in place of 4-cumylphenol.

A white solid resin was obtained after work-up in 95% uncorrected yield having an active oxygen content of 0.42%. Gel permeation chromatography (GPC) using polystyrene calibration standards indicated that the number average molecular weight (Mn) of the product polymer was 21,000, the weight average molecular weight (Mw) of the product polymer was 38,000 and the molecular weight distribution (Mw/Mn) of the product polymer was 1.81.

A DSC scan on the product polymer showed a peroxide decomposition exotherm at 150° C. The polymer product data confirmed that the product was the desired peroxy-containing bisphenol-A polycarbonate.

Based on the various recurring units in the product polymeric peroxide, the average unit weight (UW) of the product polymeric peroxide was ca. 250, there was a total of about 85 recurring units per polymer chain and there were about 6 peroxide recurring units per polymer chain.

EXAMPLE 7

Preparation of a Peroxy-Containing Polycarbonate-co-Polyarylate derived from Phosgene, Terephthaloyl Chloride, Bisphenol-A and 3-Hydroxy-1,1-dimethylbutyl Hydroperoxide In the polymeric peroxide of this example, the recurring unit of Formula I was oxy-(1,3,3-trimethyltrimethylene)dioxyterephthaloyl (Structure C), and the recurring units of Formula IV were (a) oxy-1,4-phenylene-(1-methylethylidene)-1,4-phenyleneoxycarbonyl (Structure G) and (b) oxy-1,4-phenylene-(1-methylethylidene)-1,4-phenyleneoxyterephthaloyl (Structure not illustrated).

A 2 liter 4-necked flask equipped with a mechanical stirrer, a thermometer, a Dry Ice reflux condenser and a Dry Ice cooled addition funnel was charged with 3-hydroxy-1,1-dimethylbutyl hydroperoxide (0.68 g, 0.005 mole), pyridine (10.0 g, 0.13 mole) and 500 g of methylene chloride. To the resulting solution was added terephthaloyl chloride (6.1 g, 0.03 mole) at 8°-10° C. over a period of 10 minutes. The reaction mass was then stirred for 1 hour at 8°-10° C. to complete the first stage of the reaction. To the resulting reaction mass was added 2,2-bis(4-hydroxyphenyl)propane (Bisphenol-A) (9.2 g, 0.04 mole). Phosgene (4.0 g, 0.04 mole) was then added to the reaction mass over a period of 20 minutes at 8°-10° C. and the reaction mixture was stirred an additional 1 hour. 2,2-Bis(4-hydroxyphenyl)propane (Bisphenol-A) (12.4 g, 0.054 mole), phosgene (6.0 g, 0.06 mole), pyridine (14.0 g, 0.18 mole) and 600 g of methylene chloride were then added to the reaction mixture. The phosgene was added over a period of 30 minutes at 8°-10° C. Mixing was continued for an additional 1 hour. 4-t-Butylphenol (0.75 g, 0.005 mole) was then added and the reaction mixture was further stirred for 1 hour. 4-t-Butylphenol was used as a monofunctional molecular weight regulator (i.e., an end-capping agent and a chain stopper).

The reaction mass was then poured into 1000 mL of vigorously stirred water and the lower methylene chloride layer was washed with 6% aqueous NaHCO$_3$, 3% aqueous HCl and water to obtain a pH of about 7. After drying over 10% by weight of anhydrous magnesium sulfate and separating the spent desiccant by filtration, the methylene chloride solution was poured into 1100 g of cold methanol to precipitate the polymeric peroxide. The resulting polymer was washed several times with fresh methanol followed by drying in a vacuum oven at 25° C. 21 g of a white solid resin was obtained have an active oxygen content of 0.31%. Gel permeation chromatography (GPC) using polystyrene calibration standards indicated that the number average molecular weight (Mn) of the product polymer was 4600, the weight average molecular weight (Mw) of the product polymer was 12,000 and the molecular weight distribution (Mw/Mn) of the product polymer was 2.61.

A DSC scan on the product polymer showed a peroxide decomposition exotherm at 183° C. and a glass transition temperature (Tg) of 127° C. The polymer product data confirmed that the product was the desired peroxy-containing polycarbonate-co-polyarylate.

Based on the various recurring units in the product polymeric peroxide, the average unit weight (UW) of the product polymeric peroxide was ca. 255, there was a total of about 20 recurring units per polymer chain and there was about 1 peroxide recurring unit per polymer chain.

EXAMPLE 8

Preparation of a Peroxy-containing Polycarbonate-co-Polyester derived from Phosgene, Adipoyl Chloride, Bisphenol-A and Di-(3-hydroxy-1,1-dimethylbutyl Peroxide In the polymeric peroxide of this example, the recurring units of Formula I were (a) oxy-(1,3,3-trimethyltrimethylene)dioxy-(1,1,3trimethyltrimethylene)oxycarbonyl (Structure B) and (b) oxy-(1,3,3-trimethyltrimethylene)dioxy-(1,1,3-trimethyltrimethylene)oxyadipoyl (Structure D), and the recurring units of Formula IV were (a) oxy-1,4-phenylene-(1-methylethylidene)-1,4-phenyleneoxycarbonyl (Structure G) and (b) oxy-1,4-phenylene-(I-methylethylidene)-1,4-phenyleneoxyadipoyl (Structure not illustrated).

The same procedure as used in Example 7 was used in this example. The quantities of reactants and solvents are listed below:

| Bisphenol-A | 21.6 g | 0.095 mole |
|---|---|---|
| Phosgene | 10.0 g | 0.100 mole |
| Adipoyl Chloride | 5.5 g | 0.030 mole |
| Di-(3-hydroxy-1,1-dimethylbutyl) Peroxide | 2.36 g | 0.010 mole |
| 4-t-Butylphenol | 0.75 g | 0.005 mole |
| Pyridine | 24.0 g | 0.30 mole |
| Methylene Chloride | 900 g | |
| Methanol | 800 g | |

After the work-up, 28.0 g of a fluffy tan powder was obtained having an active oxygen content of 0.27%. Gel permeation chromatography (GPC) using polystyrene calibration standards indicated that the number average molecular weight (Mn) of the product polymer was 8000, the weight average molecular weight (Mw) of the product polymer was 14,000 and the molecular weight distribution (Mw/Mn) of the product polymer was 1.75.

A DSC scan on the product polymer showed a peroxide decomposition exotherm at 203° C. and a glass transition (Tg) of 105° C. The polymer product data confirmed that the product was the desired peroxy-containing polycarbonate-co-polyester.

Based on the various recurring units in the product polymeric peroxide, the average unit weight (UW) of the product polymeric peroxide was ca. 275, there was a total of about 30 recurring units per polymer chain and there was about 1 peroxide recurring unit per polymer chain.

EXAMPLE 9

Preparation of a Peroxy-Containing Polycarbonate-co-Polyarylate derived from Phosgene, Isophthaloyl Chloride, Bisphenol-A, Tetrabromobisphenol-A, and 3-Hydroxy-1,1-dimethylbutyl Hydroperoxide In the polymeric peroxide of this example, the recurring unit of Formula I was oxy-(1,3,3-trimethyltrimethylene)dioxyisophthaloyl (Structure not illustrated) and the recurring units of Formula IV were (a) oxy-1,4-phenylene-(1-methylethylidene)-1,4-phenyleneoxycarbonyl (Structure G), (b) oxy-1,4-phenylene-(1-methylethylidene)-1,4-phenyleneoxyisophthaloyl (Structure not illustrated), (c) oxy-(2,6-dibromo-1,4-phenylene)-(1-methylethylidene)-(3,5-dibromo-1,4-phenylene)oxycarbonyl (Structure not illustrated) and (d) oxy-(2,6-dibromo-1,4-phenylene)-(1-methylethylidene)-(3,5-dibromo-1,4-phenylene)oxyisophthaloyl (Structure not illustrated).

A 2 liter 4-necked flask equipped with a mechanical stirrer, a thermometer, a Dry Ice reflux condenser, and a Dry Ice cooled addition funnel was charged with pyridine (15.0 g, 0.19 mole), 3-hydroxy-1,1-dimethylbutyl hydroperoxide (1.36 g, 0.01 mole and 400 g of methylene chloride. To the resulting solution was added isophthaloyl chloride (6.1 g, 0.03 mole) at 8°–10° C. over a period of 10 minutes. The reaction mass was then stirred for 1 hour at 8°–10° C. to complete the first stage of the reaction. To the resulting reaction mass was added 2,2-bis(4-hydroxyphenyl)propane (Bisphenol-A) (5.0 g, 0.022 mole) and 2,2-bis(3,5-dibromo-4-hydroxyphenyl)propane (Tetrabromobisphenol-A) (5.44 g, 0.010 mole). Phosgene (4.0 g, 0.04 mole) was then added to the reaction mass over a period of 30 minutes at 8°–10° C. and the reaction mixture was stirred an additional 1 hour. Pyridine (16.6 g, 0.21 mole), Bisphenol-A (17.8 g, 0.078 mole), phosgene (7.7 g, 0.078 mole) and 400 g of methylene chloride were added to the reaction mixture. The phosgene was added over a period of 30 minutes at 8°–10° C. Mixing was continued for an additional 1 hour. 4-t-Butylphenol (0.75 g, 0.005 mole) was then added and the reaction mixture was further stirred for 1 hour at 8°–10° C. 4-t-Butylphenol was used as a monofunctional molecular weight regulator (i.e., an end-capping agent and a chain stopper).

The reaction mass was then poured into 1000 mL of vigorously stirred water and the lower methylene chloride layer was washed with 6% aqueous NaHCO$_3$, 3% aqueous HCl and water to obtain a pH of about 7. After drying over 10% by weight of anhydrous magnesium sulfate and separating the spent desiccant by filtration, the methylene chloride solution was poured into 1100 g of cold methanol to precipitate the polymeric peroxide. The resulting polymer was a solid mass. The product was separated from the methanol, dissolved in 100 mL of tetrahydrofuran and reprecipitated from methanol. The resulting polymer was then dried in a vacuum oven at 25° C. 23.5 g of a white solid resin was obtained having an active oxygen content of 0.60% and a bromine content of 9.43%. Gel permeation chromatography (GPC) using polystyrene calibration standards indicated that the number average molecular weight (Mn) of the product polymer was 6700, the weight average molecular weight (Mw) of the product polymer was 16,000 and the molecular weight distribution (Mw/Mn) of the product polymer was 2.39.

The polymer product data confirmed that the product was the desired peroxy-containing polycarbonate-co-polyarylate.

Based on the various recurring units in the product polymeric peroxide, the average unit weight (UW) of the product polymeric peroxide was ca. 300, there was a total of about 22 recurring units per polymer chain and there were about 3 peroxide recurring units per polymer chain.

EXAMPLE 10

Preparation of a Peroxy-containing Polyarylate derived from Isophthaloyl Chloride, Bisphenol-A, 3-Hydroxy-1,1-dimethylbutyl Hydroperoxide In the polymeric peroxide of this example, the recurring unit of Formula I was oxy-(1,3,3-trimethyltrimethylene)dioxyisophthaloyl and the recurring unit of Formula IV was oxy-1,4-phenylene-(1-methylethylidene)-1,4-phenyleneoxyisophthaloyl (Structures not illustrated).

A 3-necked flask equipped with a mechanical stirrer, a thermometer, and an addition funnel was charged with 500 g of methylene chloride, pyridine (24.0 g, 0.30 mole), Bisphenol-A (16.0 g, 0.07 mole) and 88% 3-hydroxy-1,1-di-methylbutyl hydroperoxide (6.04 g, 0.04 mole). To the resulting solution was added isophthaloyl chloride (20.7 g, 0.10 mole) at 10°–12° C. over a period of 20 minutes. The temperature of the reaction mass was then warmed to 30° C. and the reaction mixture was stirred for 6 hours at 30°–32° C. 4-t-Butylphenol (0.75 g, 0.005 mole) was then added and the reaction mixture was further stirred for 30 minutes at 30°–32° C. 4-t-Butylphenol was used as a monofunctional molecular weight regulator (i.e., an end-capping agent and a chain stopper).

The reaction mass was then poured into 500 mL of vigorously stirred water and the lower methylene chloride layer was washed with 5% aqueous HCl, 3% aqueous NaOH, 3% aqueous $NaHCO_3$ and water to obtain a pH of about 7. After drying over 10% by weight of anhydrous magnesium sulfate and separating the spent desiccant by filtration, the methylene chloride was removed in vacuo to give 28.4 g of a white solid resin having an active oxygen content of 1.03%.

The polymer product data confirmed that the product was the desired peroxy-containing polyarylate.

EXAMPLE 11

Preparation of a Peroxy-Containing Polyarylate derived from Terephthaloyl Chloride, Bisphenol-A, and Di-(3-hydroxy-1,1-dimethylbutyl) Peroxide In the polymeric peroxide of this example, the recurring unit of Formula I was oxy-(1,3,3-trimethyltrimethylene)dioxy-(1,1,3-trimethyltrimethylene)oxyterephthaloyl and the recurring unit of Formula IV which was oxy-1,4-phenylene-(1-methylethylidene)-1,4-phenyleneoxyterephthaloyl (Structures not illustrated).

A 4-necked flask equipped with a mechanical stirrer, a thermometer, and an addition funnel was charged with 2000 g of methylene chloride, pyridine (158 g, 2.00 moles), Bisphenol-A (105.2 g, 0.45 mole) and 98% di-(3-hydroxy-1,1-di-methylbutyl) peroxide (12.0 g, 0.05 mole). To the resulting solution was added terephthaloyl chloride (110 g, 0.50 mole) at 8°–10° C. over a period of 30 minutes. The temperature of the reaction mass was then warmed to 36° C. and the reaction mixture was stirred at reflux (36°–40° C.) for 6 hours. 4-t-Butylphenol (0.75 g, 0.005 mole) was then added and the reaction mixture was further stirred for 30 minutes at 36°–40° C. 4-t-Butylphenol was used as a monofunctional molecular weight regulator (i.e., an end-capping agent and a chain stopper). A heavy solid formed which was separated by filtration and washed with 2% aqueous HCl, 3% aqueous $Na_2CO_3$, 3% aqueous $NaHCO_3$, water (to a pH of about 7) and methanol. After drying over 10% by weight of anhydrous magnesium sulfate and separating the spent desiccant by filtration, the solid product was allowed to dry in a hood at room temperature over a 24-hour period.

165 g (92% yield) of a white solid resin was obtain having an active oxygen content of 0.29%. Gel permeation chromatography (GPC) using polystyrene calibration standards indicated that the number average molecular weight (Mn) of the product polymer was 2100, the weight average molecular weight (Mw) of the product polymer was 3200 and the molecular weight distribution (Mw/Mn) of the product polymer was 1.52.

A DSC scan on the product polymer showed a peroxide decomposition exotherm at 197° C. The polymer product data confirmed that the product was the desired peroxy-containing polyarylate.

Based on the various recurring units in the product polymeric peroxide, the average unit weight (UW) of the product polymeric peroxide was ca. 360, there was a total of about 6 recurring units per polymer chain and there were 0.38 peroxide recurring units per polymer chain. The product was a mixture of novel polymeric peroxide and non-peroxide containing polymers.

EXAMPLE 12

Preparation of a Peroxy-Containing Polyester derived from Adipoyl Chloride and Di-(3-hydroxy-1,1-dimethylbutyl) Peroxide In the polymeric peroxide of this example, the recurring unit of Formula I was oxy-(1,3,3-trimethyltrimethylene)dioxy-(1,1,3-trimethytrimethylene)oxyadipoyl (Structure D). There was no recurring unit of Formula IV in the polymeric peroxide of this example.

A 4-necked flask equipped with a mechanical stirrer, a thermometer, and an addition funnel was charged with 100 g of methylene chloride, pyridine (16.0 g, 0.20 mole) and 98% di-(3-hydroxy-1,1-dimethylbutyl) peroxide (23.9 g, 0.10 mole). To the resulting solution was added adipoyl chloride (18.7 g, 0.10 mole) at 10°–12° C. over a period of 10 minutes. The temperature of the reaction mass was then warmed to 30° C. and the reaction mixture was stirred for 6 hours at 30°–32° C. 4-t-Butylphenol (0.75 g, 0.005 mole) was then added and the reaction mixture was further stirred for 30 minutes at 30°–32° C. 100 mL of water was added and the lower methylene chloride layer was separated and washed with 3% aqueous HCl and 3% aqueous $NaHCO_3$. After drying over 10% by weight of anhydrous magnesium sulfate and separating the spent desiccant by filtration, the methylene chloride was removed in vacuo leaving 27.0 g (77% yield) of a waxy solid having an active oxygen content of 4.58% (theoretical is 4.87%).

The polymer product data confirmed that the product was the desired peroxy-containing polyester.

EXAMPLE 13

Preparation of a Peroxy-Containing Bisphenol-A Polycarbonate derived from Phosgene, Bisphenol-A and 3-Hydroxy-1,1-dimethylpropyl Hydroperoxide In the polymeric peroxide of this example, the recurring unit of Formula I was oxy-(3,3-dimethyltrimethylene)dioxycarbonyl (Structure E) and the recurring unit of Formula IV was oxy-1,4-phenylene-(1-methylethylidene)-1,4-phenyleneoxycarbonyl (Structure G).

The same procedure and the same reactants as used in Example 6 were used in this example except 3-hydroxy-1,1-dimethylpropyl hydroperoxide was used in place of 3-hydroxy-1,1-dimethylbutyl hydroperoxide.

After the reaction and work-up, 24.0 g (86% yield) of a white solid resin was obtained having an active oxygen content of 0.78%. Gel permeation chromatography (GPC) using polystyrene calibration standards indicated that the number average molecular weight (Mn) of the product polymer was 10,000, the weight average molecular weight (Mw) of the product polymer was 18,000 and the molecular weight distribution (Mw/Mn) of the product polymer was 1.80.

A DSC scan on the product polymer showed a peroxide decomposition exotherm at 158° C. The polymer product data confirmed that the product was the desired peroxy-containing bisphenol-A polycarbonate.

Based on the various recurring units in the product polymeric peroxide, the average unit weight (UW) of the product polymeric peroxide was ca. 300, there was a total of about 35 recurring units per polymer chain and there were about 5 peroxide recurring units per polymer chain.

EXAMPLE 14

Preparation of a Peroxy-Containing Polyarylate co-Polyurethane derived from Isophthaloyl Chloride, Tolylene-2,4-diisocyanate, Bisphenol-A, and Di-(3-hydroxy-1,1-dimethylbutyl) Peroxide In the polymeric peroxide of this example, the recurring units of Formula I were (a) oxy-(1,3,3-trimethyltrimethylene)dioxy-(1,1,3-trimethyltrimethylene)oxyisophthaloyl (Structure F) and (b) oxy-(1,3,3-trimethyltrimethylene)dioxy-(1,1,3-trimethyltrimethylene)oxycarbonylimino-(x-methyl-1,3-phenylene)iminocarbonyl (Structure J) and the recurring units of Formula IV were (a) oxy-1,4-phenylene-(1-methylethylidene)-1,4-phenyleneoxyisophthaloyl (Structure not illustrated) and (b) oxy-1,4-phenylene-(1-methylethylidene)-1,4-phenyleneoxycarbonylimino-(x-methyl-1,3-phenylene)iminocarbonyl (Structure H).

A 4-necked flask equipped with a mechanical stirrer, a thermometer, a reflux condenser and an addition funnel was charged with 400 g of methylene chloride, pyridine (39.5 g, 0.50 mole), 2,2-bis(4-hydroxyphenyl)-propane (Bisphenol-A) (49.5 g, 0.18 mole) and di-(3-hydroxy-1,1-dimethylbutyl) peroxide (4.8 g, 0.020 mole). To the resulting stirred solution were simultaneously added isophthaloyl chloride (20.5 g, 0.10 mole) and tolylene-2,4-diisocyanate (18.0 g, 0.10 mole) at 8°-10° C. over a period of 20 minutes. 4-t-Butylphenol (0.75 g, 0.005 mole) was then added to the reaction mixture. The reaction temperature was raised to 36° C. and the reaction mass was stirred at reflux (36°-39° C.) for 6 hours.

The reaction mass was then poured into 200 mL of vigorously stirred water and the resulting solid was separated by filtration and washed with 3% aqueous HCl, 3% aqueous Na$_2$CO$_3$, 3% aqueous NaHCO$_3$, water (to a pH of about 7) and methanol. The resulting polymer was dried in a hood at 25° C. for 24 hours. 18.0 g of a white powder was obtained having an active oxygen content of 0.12%.

Based on the method of preparation and the product active oxygen content, the polymeric product was determined to be the desired peroxy-containing polyarylate-co-polyurethane.

EXAMPLE 15

Preparation of a Peroxy-containing Polyester derived from Dodecanedioyl Chloride, Bisphenol-A and 3-Hydroxy-1,1-dimethylbutyl Hydroperoxide In the polymeric peroxide of this example, the recurring unit of Formula I was oxy-(1,3,3-trimethyltrimethylene)dioxycarbonyldecamethylenecarbonyl and the recurring unit of Formula IV was oxy-1,4-phenylene-(1-methylethylidene)-1,4-phenyleneoxycarbonyldecamethylenecarbonyl (Structures not illustrated).

A 3-necked flask equipped with a mechanical stirrer, a thermometer, and an addition funnel was charged with 2000 g of methylene chloride, pyridine (68.5 g, 0.87 mole), Bisphenol-A (71.1 g, 0.32 mole), 91.3% 3-hydroxy-1,1-dimethylbutyl hydroperoxide (1.1 g, 0.0075 mole) and 4-t-butylphenol (2.02 g, 0.013 mole). The resulting reaction mass was stirred at 20°-22° C. The stirred solution was then cooled to 8° C. and to it was added 90.5% dodecanedioyl chloride (109.8 g, 0.37 mole) at 8°-10° C. over a period of 30 minutes. The temperature of the reaction mass was then increased to 36° C. and stirring was continued for 2 hours at 36°-38° C. The resulting solution was cooled to −20° C. A waxy precipitate formed and settled to the bottom of the flask. The upper liquid layer was removed and the remaining solid was dissolved in 1000 mL of tetrahydrofuran (THF). The THF solution was then poured into 2000 mL of vigorously stirred methanol in order to precipitate the solid product. The solid was separated at −20° C. via filtration and the separated solid was dried. 131.0 g of a white solid resin was obtained having an active oxygen content of 0.10%. DSC analysis revealed the presence of peroxide in the product owing to a small peroxide decomposition exotherm at about 160° C.

Gel permeation chromatography (GPC) using polystyrene calibration standards indicated that the number average molecular weight (Mn) of the product polymer was 9300, the weight average molecular weight (Mw) of the product polymer was 18,000 and the molecular weight distribution (Mw/Mn) of the product polymer was 1.94. Based on an active oxygen content of 0.10% and a polymer weight average molecular weight (Mw) of 18,000, there were 0.58 peroxide (peroxyester) groups per polymer molecule. The product was a mixture of novel polymeric peroxide and non-peroxide containing polymers.

The polymer product data confirmed that the product was the desired peroxy-containing polyester.

EXAMPLE 16

Preparation of a Peroxy-Containing Aliphatic Polycarbonate derived from Phosgene, TONE ® 201 Oligomeric Diol and 3-Hydroxy-1,1-dimethylbutyl Hydroperoxide In the polymeric peroxide of this example, the recurring unit of Formula I was oxy-(1,3,3-trimethyltrimethylene)oxycarbonyl and the recurring unit of Formula IV was oxy(TONE ® 201 diradical)oxycarbonyl (Structures not illustrated).

A 4-necked flask equipped with a mechanical stirrer, a thermometer, a Dry Ice condenser and an addition funnel was charged with 800 g of ethyl acetate, TONE ® 201 (an oligomeric polycaprolactone based diol, having a molecular weight of ca. 530, manufactured by Union Carbide Corporation) (57.2 g, 0.108 mole), n-butanol (0.45 g, 0.006 mole), pyridine (18.2 g, 0.228 mole) and 91.3% 3-hydroxy-1,1-dimethylbutyl hydroperoxide (0.44 g, 0.003 mole). The resulting reaction mass was stirred at 20°-22° C. The stirred solution was then cooled to 10° C. and to it was added liquid phosgene (11.3 g, 0.114 mole) at 8°-10° C. over a period of 30 minutes. The temperature of the reaction mass was then increased to 40° C. and stirring was continued for 2 hours at 40°-42° C. A white precipitate of pyridinium chloride formed. The resulting reaction mass was cooled to −20° C. and the solid pyridinium chloride was separated by filtration and was discarded. The ethyl acetate was removed in vacuo leaving 55.0 g of a waxy solid having an active oxygen content of 0.04%.

Gel permeation chromatography (GPC) using polystyrene calibration standards indicated that the number average molecular weight (Mn) of the product polymer was 2300, the weight average molecular weight (Mw) of the product polymer was 4600 and the molecular weight distribution (Mw/Mn) of the product polymer was 2.0. Based on active oxygen content of 0.04% and a polymer weight average molecular weight (Mw) of 4600, there were 0.06 monoperoxycarbonate peroxide groups per polymer molecule. The product was a mixture of novel polymeric peroxide and non-peroxide containing polymers.

The polymer product data confirmed that the product was the desired peroxy-containing aliphatic polycarbonate.

EXAMPLE 17

Preparation of a Peroxy-Containing Polyester derived from Terephthaloyl Chloride, TONE ® 201 Oligomeric Diol and 3-Hydroxy-1,1-dimethylbutyl Hydroperoxide In the polymeric peroxide of this example, the recurring unit of Formula I was oxy-(1,3,3-trimethyltrimethylene)oxyterephthaloyl and the recurring unit of Formula IV was oxy(TONE ® 201 diradical)oxyterephthaloyl (Structures not illustrated).

A 3-necked flask equipped with a mechanical stirrer, a thermometer and an addition funnel was charged with pyridine (22.8 g, 0.28 mole), n-butanol (0.89 g, 0.012 mole), TONE ® 201 (89.0 g, 0.167 mole), 4-dimethylaminopyridine (DMAP) (0.36 g, 0.002 mole) and 91.3% 3-hydroxy-1,1-dimethylbutyl hydroperoxide (0.88 g, 0.006 mole). The resulting reaction mass was stirred at 20°-22° C. To the stirred solution was slowly added 96% terephthaloyl chloride (38.1 g, 0.18 mole) over a period of 40 minutes. The temperature of the reaction mass was increased to 50° C. and stirring was continued for 4 hours at 50°-55° C. 200 g of water was added and the reaction mixture was stirred for an additional 30 minutes at 50°-55° C. The aqueous layer was separated from the organic phase and was discarded. The organic phase was then poured into 100 mL of vigorously stirred methanol and the resulting slurry was stirred for 30 minutes at room temperature. The spent methanol was separated by decantation and the residue was dried. 86.0 g of a white solid was obtained having an active oxygen content of 0.02%.

Gel permeation chromatography (GPC) using polystyrene calibration standards indicated that the number average molecular weight (Mn) of the product polymer was 2700, the weight average molecular weight (Mw) of the product polymer was 9300 and the molecular weight distribution (Mw/Mn) of the product polymer was 3.4. Based on an active oxygen content of 0.02% and a polymer weight average molecular weight (Mw) of 9300, there were 0.03 peroxyester peroxide groups per polymer molecule. The product was a mixture of novel polymeric peroxide and non-peroxide containing polymers.

The polymer product data confirmed that the product was the desired peroxy-containing polyester.

EXAMPLE 18

Preparation of a Peroxy-Containing Aliphatic Polycarbonate derived from a Bischloroformate of TONE ® 210 Oligomeric Diol, TONE ® 201 Oligomeric Diol and 3-Hydroxy-1,1-di-methylbutyl Hydroperoxide In the polymeric peroxide of this example, the recurring unit of Formula I was oxy-(1,3,3-trimethyltrimethylene)dioxycarbonyloxy(TONE ® 210 diradical)oxycarbonyl and the recurring unit of Formula IV was oxy(TONE ® 201 diradical)oxycarbonyloxy(TONE ® 210 diradical)oxycarbonyl (Structures not illustrated).

The bischloroformate of TONE ® 210 (an oligomeric polycaprolactone based diol, having a molecular weight of ca. 800 based on a hydroxyl content of 4.12%, manufactured by Union Carbide Corporation) was initially synthesized in a purity of 96% by reacting TONE ® 210 with excess phosgene and isolating the resulting bischloroformate.

A 3-necked flask equipped with a mechanical stirrer, a thermometer, and an addition funnel was charged with n-butanol (0.45 g, 0.006 mole), TONE ® 201 (27.0 g, 0.051 mole), 91.3% 3-hydroxy-1,1-dimethylbutyl hydroperoxide (0.44 g, 0.003 mole), pyridine (9.1 g, 0.114 mole) and DMAP (0.60 g, 0.005 mole). The resulting reaction mass was stirred at 28°-30° C. To the resulting vigorously stirred solution was slowly added 96% TONE ® 210 bischloroformate (54.4 g, 0.057 mole) at 28°-30° C. over a period of 30 minutes. The temperature of the reaction mass was then increased to 55° C. and stirring was continued for 3 hours at 55°-60° C. 100 g of water was added and the reaction mixture was stirred for an additional 30 minutes at 55°-60° C. The aqueous layer was separated from the organic phase and was discarded. The organic phase was then poured into 100 mL of vigorously stirred methanol and the resulting slurry was stirred for 30 minutes at 50-55. The methanol was separated from the product by decantation and the product was dried. 69.0 g of a white solid was obtained having an active oxygen content of 0.05%.

Gel permeation chromatography (GPC) using polystyrene calibration standards indicated that the number average molecular weight (Mn) of the product polymer was 8500, the weight average molecular weight (Mw) of the product polymer was 16,000 and the molecular weight distribution (Mw/Mn) of the product polymer was 1.9. Based on an active oxygen content of 0.05% and a polymer weight average molecular weight (Mw) of 16,000, there were 0.27 monoperoxycarbonate peroxide groups per polymer molecule. The product was a mixture of novel polymeric peroxide and non-peroxide containing polymers.

The polymer product data confirmed that the product was the desired peroxy-containing aliphatic polycarbonate.

EXAMPLE 19

Preparation of a Polyester-Polystyrene Block Copolymer Using Peroxy-Containing Polyester derived from Dodecanedioyl Chloride, Bisphenol-A and 3-Hydroxy-1,1-dimethylbutyl Hydroperoxide as the Polyester Free-Radical Initiator for the Styrene Polymerization This example illustrates the preparation of a condensation/addition block copolymer using a peroxy-condensation polymer as the free-radical initiator for polymerizing an addition monomer, such as styrene.

A 3-necked flask equipped with a mechanical stirrer, a thermometer and a condenser was charged with 100 mL of xylenes, 30.0 g of styrene and 5.0 g of the peroxy-containing polyester prepared in Example 15 at room temperature. Dry nitrogen gas was bubbled into the resulting solution which was heated and stirred at 110°-20° C. for 8.0 hours. The reaction mixture was poured into a shallow glass bake pan and unreacted styrene and xylenes were allowed to evaporate over a period of 24 hours in a well ventilated hood. A sticky solid was obtained which was treated with 50 mL portions of pentane to remove styrene and xylenes. A spatula was used to stir the polymer in the pentane. The pentane was then decanted away from the polymer. A total of seven pentane extractions were conducted. After the last extraction, the solid polymer was dried in a well ventilated hood over a period of 6 hours at room temperature. 13.5 g (38.6% of theory, uncorrected) of a white solid polymer was obtained.

Gel permeation chromatography (GPC) using polystyrene calibration standards indicated that the number average molecular weight (Mn) of the product polyester/polystyrene block copolymer was 12,000 and the weight average molecular weight (Mw) of the product polymer was 110,000. An infrared spectrum of the product polyester/polystyrene block copolymer showed a polyester carbonyl absorption band at about 1760 cm$^{-1}$ and all of the major polystyrene infrared absorption bands. Whereas the starting peroxy-containing polyester from Example 14 contained 0.10% active oxygen and resulted in a DSC peroxide decomposition exotherm at 160° C., the product polyester/polystyrene block copolymer of the present example contained no active oxygen and its DSC scan showed no peroxide decomposition exotherm.

The active oxygen data, the infrared data and the DSC data for the product of this example and the method of preparation confirmed that the desired polyester/polystyrene block copolymer was obtained.

The present invention may be embodied in other specific forms without departing from the spirit or essential attributes thereof and, accordingly, reference should be made to the appended claims, rather than to the foregoing specification as indicating the scope of the invention.

I claim:

1. A polymeric peroxide compound having a molecular weight of about 1,000 to about 200,000 comprising at least one divalent recurring unit, each independently having the following Formula I:

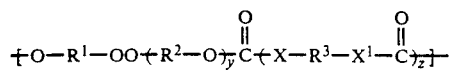

wherein

R$^1$ and R$^2$ are independently substituted alkylene diradicals of 2 to 8 carbons, where the substituents are two or more lower alkyl radicals of 1 to 4 carbons, two of the substituents being located on the carbon atoms of the R$^1$ and R$^2$ alkylene diradicals that are adjacent to the —CO— group;

R$^3$ is an alkylene diradical of 2 to 18 carbons, where the diradical may contain one or more oxygen, sulfur or nitrogen heteroatoms, with the proviso that multiple heteroatoms must be separated from each other by at least one carbon atom and the diradical ends by at least two carbon atoms, an alkenylene diradical of 2 to 6 carbons, a substituted or unsubstituted arylene diradical of 6 to 14 carbons, a substituted or unsubstituted hexahydroaralkylene diradical of 8 to 12 carbons, a substituted or unsubstituted diradical having the following Formula II:

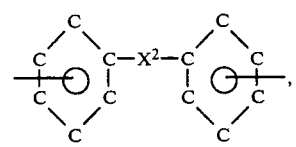

wherein the R$^3$ substituents are alkyl of 1 to 15 carbons, bromo, chloro, nitro, sulfo or carboxy, a polymeric diradical having a molecular weight of up to about 5,000, wherein the polymeric diradical is a poly(oxyethylene) diradical, a poly(oxypropylene) diradical, a poly(oxytetramethylene) diradical, a poly(oxyethylene-block-oxypropylene) diradical, a poly(oxyethylene-block-oxypropylene-block-oxyethylene) diradical, a polybutadiene diradical, or a polymeric diradical having the following Formula III:

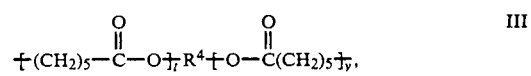

or, when both X and X$^1$ are direct bonds, a methylene diradical;

R$^4$ is an alkylene diradical of 2 to 8 carbons, where the diradical may contain one or more oxygen, sulfur or nitrogen heteroatoms, with the proviso that multiple heteroatoms must be separated from each other by at least one carbon atom and the diradical ends by at least two carbon atoms;

X and X$^1$ are independently a direct bond, —O— or —NH—;

X$^2$ is a direct bond, —O—, —S—, —S(=O)—, —S(=O)$_2$—, —C(=O)—, a substituted or unsubstituted alkylene diradical of 1 to 6 carbons in which the substituent is lower alkyl of 1 to 4 carbons, a substituted or unsubstituted alkylidene diradical of 2 to 12 carbons where the substituents are lower alkyl of 1 to 4 carbons, fluoro, chloro or bromo, or a substituted or unsubstituted cycloalkylidene diradical of 6 to 12 carbons where the substituents are lower alkyl of 1 to 4 carbons, fluoro, chloro or bromo;

t and v are integers and the sum of t and v is 2 to 30; y and z are 0 or 1; and the recurring unit of Formula I has a 10-hour half-life temperature of at least 80° C.

2. The polymeric peroxide compound of claim 1 further comprising at least one divalent recurring unit, each independently having the following Formula IV:

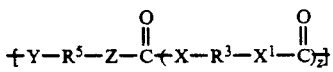

wherein $R^5$ is a substituted or unsubstituted alkylene diradical of 2 to 18 carbons, where the diradical may contain one or more oxygen, sulfur or nitrogen heteroatoms, with the proviso that multiple heteroatoms must be separated from each other by at least one carbon atom and the diradical ends by at least two carbon atoms; a substituted or unsubstituted cycloalkylene diradical of 5 to 7 carbons; a substituted or unsubstituted alkenylene diradical of 2 to 6 carbons; a substituted or unsubstituted arylene diradical of 6 to 14 carbons; a substituted or unsubstituted aralkylene diradical of 8 to 12 carbons; a substituted or unsubstituted hexahydroaralkylene diradical of 8 to 12 carbons; a substituted or unsubstituted diradical having the following Formula II:

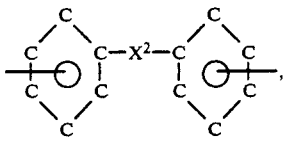

wherein the $R^5$ substituents are alkyl of 1 to 15 carbons, bromo, chloro, nitro, sulfo or carboxy; or a polymeric diradical having a molecular weight of up to about 5,000, wherein the polymeric diradical is one or more of a poly(oxyethylene) diradical, a poly(oxypropylene) diradical, a poly(oxytetramethylene) diradical, a poly(oxyethylene-block-oxypropylene) diradical, a poly(oxyethylene-block-oxypropylene-block-oxyethylene) diradical or a polybutadiene diradical, or a polymeric diradical having the following Formula III:

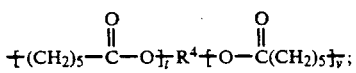

Y and z are independently —O—, —NH— or —$NR^6$—;
wherein $R^6$ is alkyl of 1 to 8 carbons and when Y and Z are independently —$NR^6$—, the $R^6$ groups can together form an alkylene bridge of two carbon atoms between the nitrogen atoms.

3. The compound according to claim 2 comprising at least one unit of Formula I and from about 5 units to about 1000 units of Formula I and Formula IV.

4. The compound of claim 1 wherein Formula I is oxy-(1,3,3-trimethyltrimethylene)dioxy-(1,1,3-trimethyltrimethylene)oxyadipoyl.

5. The compound of claim 2 wherein Formula I is oxy-(1,3,3-trimethyltrimethylene)dioxycarbonyloxyethyleneoxyethyleneoxycarbonyl and Formula IV is
   i) oxy-1,4-phenylene-(1-methylethylidene)-1,4-phenyleneoxycarbonyl and
   ii) oxy-1,4-phenylene-(1-methylethylidene)-1,4-phenyleneoxycarbonyoxyethyleneoxyethyleneoxycarbonyl.

6. The compound of claim 2 wherein Formula I is oxy-(1,3,3-trimethyltrimethylene)dioxy-(1,1,3-trimethyltrimethylene)oxycarbonyl and Formula IV is oxy-1,4-phenylene-(1-methylethylidene)-1,4-phenyleneoxycarbonyl.

7. The compound of claim 2 wherein Formula I is oxy-(1,3,3-trimethyltrimethylene)dioxycarbonyl and Formula IV is oxy-1,4-phenylene-(1-methylethylidene)-1,4-phenyleneoxycarbonyl.

8. The compound of claim 2 wherein Formula I is oxy-(1,3,3-trimethyltrimethylene)dioxyterephthaloyl and Formula IV is
   i) oxy-1,4-phenylene-(1-methylethylidene)-1,4-phenyleneoxycarbonyl and
   ii) oxy-1,4-phenylene-(1-methylethylidene)-1,4-phenyleneoxyterephthaloyl.

9. The compound of claim 2 wherein Formula I is
   i) oxy-(1,3,3-trimethyltrimethylene)dioxy-(1,1,3-trimethyltrimethylene)oxycarbonyl and
   ii) oxy-(1,3,3-trimethyltrimethylene)dioxy-(1,1,3-trimethyltrimethylene)oxyadipoyl; and
formula IV is
   i) oxy-1,4-phenylene-(1-methylethylidene)-1,4-phenyleneoxycarbonyl and
   ii) oxy-1,4-phenylene-(1-methylethylidene)-1,4-phenyleneoxyadipoyl.

10. The compound of claim 2 wherein Formula I is oxy-(1,3,3-trimethylrimethylene)dioxyisophthaloyl and Formula IV is
    i) oxy-1,4-phenylene-(1-methylethylidene)-1,4-phenyleneoxycarbonyl,
    ii) oxy-1,4-phenylene-(1-methylethylidene)-1,4-phenyleneoxyisophthaloyl,
    iii) oxy-(2,6-dibromo-1,4-phenylene)-(1-methylethylidene)-(3,5-dibromo-1,4-phenylene)oxycarbonyl and
    iv) oxy-(2,6-dibromo-1,4-phenylene)-(1-methylethylidene)-(3,5-dibromo-1,4-phenylene)oxyisophthaloyl.

11. The compound of claim 2 wherein Formula I is oxy-(1,3,3-trimethyltrimethylene)dioxyisophthaloyl and Formula IV is oxy-1,4-phenylene-(1-methylethylidene)-1,4-phenyleneoxyisophthaloyl.

12. The compound of claim 2 wherein Formula I is oxy-(1,3,3-trimethyltrimethylene)dioxy-(1,1,3-trimethyltrimethylene)oxyterephthaloyl and Formula IV is oxy-1,4-phenylene-(1-methylethylidene)-1,4-phenyleneoxyterephthaloyl.

13. The compound of claim 2 wherein Formula I is oxy-(3,3-dimethyltrimethylene)dioxycarbonyl and Formula IV is oxy-1,4-phenylene-(1-methylethylidene)-1,4-phenyleneoxycarbonyl.

14. The compound of claim 2 wherein Formula I is
    i) oxy-(1,3,3-trimethyltrimethylene)dioxy-(1,1,3-trimethyltrimethylene)oxyisophthaloyl and
    ii) oxy-(1,3,3-trimethyltrimethylene)dioxy-(1,1,3-trimethyltrimethylene)oxycarbonylimino-(x-methyl-1,3-phenylene)iminocarbonyl; and
formula IV is
    i) oxy-1,4-phenylene-(1-methylethylidene)-1,4-phenyleneoxyisophthaloyl and
    ii) oxy-1,4-phenylene-(1-methylethylidene)-1,4-phenyleneoxycarbonylimino-(x-methyl-1,3-phenylene)iminocarbonyl.

15. The compound of claim 2 wherein Formula I is oxy-(1,3,3-trimethyltrimethylene)dioxycarbonyldecamethylenecarbonyl and Formula IV is oxy-1,4-phenylene-(1-methylethylidene)-1,4-phenyleneoxycarbonyldecamethylenecarbonyl.

16. The compound of claim 2 wherein Formula I is oxy-(1,3,3-trimethyltrimethylene)oxycarbonyl and Formula IV is oxy(TONE ® 201 diradical)oxycarbonyl, where TONE ® 201 diradical is a diradical of Formula III, wherein the sum of t and v is about 4 to about 6.

17. The compound of claim 2 wherein Formula I is oxy-(1,3,3-trimethyltrimethylene)oxyterephthaloyl and Formula IV is oxy(TONE ® 201 diradical)oxyterephthaloyl, where TONE ® 201 diradical is a diradical of Formula III, wherein the sum of t and v is about 4 to about 6.

18. The compound of claim 2 wherein Formula I is oxy-(1,3,3-trimethyltrimethylene)dioxycarbonyloxy(-TONE ® 210 diradical)oxycarbonyl and Formula IV is oxy(TONE ® 201 diradical)oxycarbonyloxy(TONE ® 210 diradical)oxycarbonyl, where TONE ® 201 diradical is a diradical of Formula III, wherein the sum of t and v is about 4 to about 6 and where TONE ® 210 diradical is a diradical of Formula III, wherein the sum of t and v is about 7.

19. A process for preparing a polymeric peroxide compound comprising reacting a peroxide having the following Formula V:

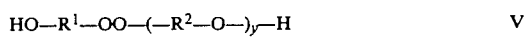

wherein $R^1$ and $R^2$ are independently substituted alkylene diradicals of 2 to 8 carbons, where the substituents are two or more lower alkyl radicals of 1 to 4 carbons, two of the substituents being located on the carbon atoms of the $R^1$ and $R^2$ alkylene diradicals that are adjacent to the —OO— group; and y is 0 or 1;

with one or more of phosgene, a bis-haloformate, a polyhaloformate, a diacid halide, a polyacid halide, a diisocyanate, a polyisocyanate and a dianhydride, to form the polymeric peroxide compound;

followed by isolating the polymeric peroxide compound.

20. The process according to claim 19, further comprising conducting the reaction in the presence of a catalyst and a solvent.

21. The process according to claim 19 further comprising conducting the reaction in the presence of one or more of a diol, a polyol, a diamine, a polyamine, an amino alcohol and a polyfunctional amino alcohol.

22. The process according to claim 19 further comprising conducting the reaction in the presence of a monofunctional molecular weight regulator.

23. A process of curing an unsaturated polyester resin comprising heating the resin with an amount of a polymeric peroxide compound according to claim 1 at a temperature effective to cure the polyester resin.

24. A process for polymerizing an ethylenically unsaturated monomer comprising mixing an amount of a polymeric peroxide compound according to claim 1 with an ethylenically unsaturated monomer at a temperature effective to initiate free radical polymerization of the ethylenically unsaturated monomer.

25. A process for curing an elastomer resin comprising heating the resin with an amount of a polymeric peroxide compound according to claim 1 at a temperature effective to cure the elastomer resin.

26. A process for reducing the molecular weight of a polypropylene and propylene copolymer and modifying the molecular weight distribution of a polypropylene and propylene copolymer comprising heating the polypropylene and propylene copolymer with an amount of a polymeric peroxide compound according to claim 1 at a temperature effective to reduce the molecular weight of the polypropylene and propylene copolymer and to modify the molecular weight distribution of the polypropylene and propylene copolymer.

27. A process for crosslinking an olefin polymer comprising heating the olefin polymer with a crosslinking amount of a polymeric peroxide compound according to claim 1 at a temperature effective to crosslink the olefin polymer.

28. A process for preparing a block copolymer comprising partially reacting a polymeric peroxide compound according to claim 1 with a first ethylenically unsaturated monomer at a temperature effective to initiate free radical polymerization of the ethylenically unsaturated monomer and complete reacting of the polymeric peroxide in the presence of a second ethylenically unsaturated monomer at a temperature effective to initiate free radical polymerization of the second ethylenically unsaturated monomer, forming a block copolymer with polymer blocks derived from the first and second ethylenically unsaturated monomers.

29. A process of curing an unsaturated polyester resin comprising heating the resin with an amount of a polymeric peroxide compound according to claim 2 at a temperature effective to cure the polyester resin.

30. A process for polymerizing an ethylenically unsaturated monomer comprising mixing an amount of a polymeric peroxide compound according to claim 2 with an ethylenically unsaturated monomer at a temperature effective to initiate free radical polymerization of the ethylenically unsaturated monomer.

31. A process for curing an elastomer resin comprising heating the resin with an amount of a polymeric peroxide compound according to claim 2 at a temperature effective to cure the elastomer resin.

32. A process for reducing the molecular weight of a polypropylene and propylene copolymer and modifying the molecular weight distribution of a polypropylene and propylene copolymer comprising heating the polypropylene and propylene copolymer with an amount of a polymeric peroxide compound according to claim 2 at a temperature effective to reduce the molecular weight of the polypropylene and propylene copolymer and to modify the molecular weight distribution of the polypropylene and propylene copolymer.

33. A process for crosslinking an olefin polymer comprising heating the olefin polymer with a crosslinking amount of a polymeric peroxide compound according to claim 2 at a temperature effective to crosslink the olefin polymer.

34. A process for preparing a block copolymer comprising partially reacting a polymeric peroxide compound according to claim 2 with a first ethylenically unsaturated monomer at a temperature effective to initiate free radical polymerization of the ethylenically unsaturated monomer and complete reacting of the polymeric peroxide in the presence of a second ethylenically unsaturated monomer at a temperature effective to initiate free radical polymerization of the second ethylenically unsaturated monomer, forming a block copolymer with polymer blocks derived from the first and second ethylenically unsaturated monomers.

35. A process for preparing a block copolymer comprising reacting a polymeric peroxide compound according to claim 2 with an ethylenically unsaturated monomer at a temperature effective to initiate free radical polymerization of the ethylenically unsaturated monomer, forming a block copolymer.

* * * * *